United States Patent
Cha

(10) Patent No.: US 10,361,580 B2
(45) Date of Patent: Jul. 23, 2019

(54) APPARATUS AND METHOD FOR CHARGING ELECTRONIC DEVICE HAVING BATTERY

(71) Applicant: Samsung Electronics Co., Ltd, Suwon-si (KR)

(72) Inventor: Jungyoon Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 569 days.

(21) Appl. No.: 14/998,127

(22) Filed: Dec. 24, 2015

(65) Prior Publication Data

US 2016/0190861 A1    Jun. 30, 2016

(30) Foreign Application Priority Data

Dec. 24, 2014    (KR) .................... 10-2014-0187911

(51) Int. Cl.
*H02J 7/02* (2016.01)
*H02J 7/00* (2006.01)
*H02J 7/04* (2006.01)

(52) U.S. Cl.
CPC .............. *H02J 7/025* (2013.01); *H02J 7/00* (2013.01); *H02J 7/0021* (2013.01); *H02J 7/045* (2013.01); *H02J 2007/0096* (2013.01)

(58) Field of Classification Search
CPC .......... H02J 7/025; H02J 7/0021; H02J 7/045; H02J 2007/0096; H02J 50/10
USPC ........................................................ 320/108
See application file for complete search history.

(56) References Cited

U.S. PATENT DOCUMENTS

| | | |
|---|---|---|
| 2007/0279002 A1 | 12/2007 | Partovi |
| 2009/0001929 A1 | 1/2009 | Posamentier |
| 2009/0096413 A1 | 4/2009 | Partovi et al. |
| 2010/0207575 A1 | 8/2010 | Pijnenburg et al. |
| 2011/0057607 A1 | 3/2011 | Carobolante |

(Continued)

FOREIGN PATENT DOCUMENTS

| | | |
|---|---|---|
| KR | 20130119701 A | 11/2013 |
| KR | 20140028385 A | 3/2014 |

(Continued)

OTHER PUBLICATIONS

Extended European Search Report dated Apr. 29, 2016 in connection with European Application No. 15201354.6, 6 pages.

(Continued)

*Primary Examiner* — Nathaniel R Pelton

(57) ABSTRACT

According to an embodiment of the present disclosure, a method for operating an electronic device may include receiving information related to a second battery from an external electronic device having the second battery by an electronic device having a first battery and a charger for charging the first battery; and identify at least one operation of: 1) receiving an electric power from the external electronic device to the electronic device, 2) supplying an electric power from the electronic device to the external electronic device, or 3) not transferring an electric power between the electronic device and the external electronic device, by the electronic device based at least one of the information related to the second battery or information related to the first battery. Further, various embodiments can be implemented.

41 Claims, 19 Drawing Sheets

(56) References Cited

U.S. PATENT DOCUMENTS

| | | | |
|---|---|---|---|
| 2011/0221391 A1 | 9/2011 | Won et al. | |
| 2011/0260681 A1 | 10/2011 | Guccione et al. | |
| 2012/0295634 A1* | 11/2012 | Kim | H02J 7/025 455/456.1 |
| 2013/0029595 A1 | 1/2013 | Widmer et al. | |
| 2013/0214735 A1 | 8/2013 | Kang et al. | |
| 2013/0281160 A1 | 10/2013 | Han et al. | |
| 2014/0015478 A1 | 1/2014 | Von Novak | |
| 2015/0032661 A1* | 1/2015 | Manfield | B60L 1/14 705/347 |
| 2015/0207363 A1* | 7/2015 | Taki | H02J 50/12 307/104 |
| 2015/0263548 A1* | 9/2015 | Cooper | H02J 7/0027 320/108 |
| 2015/0311955 A1* | 10/2015 | Lu | H04B 5/0037 455/419 |
| 2015/0380971 A1* | 12/2015 | Priev | H02J 7/0027 320/108 |
| 2016/0028269 A1* | 1/2016 | Miller | H02J 50/10 455/573 |
| 2016/0049825 A1* | 2/2016 | Green | H02J 7/04 320/108 |
| 2016/0336804 A1* | 11/2016 | Son | H02J 7/0027 |

FOREIGN PATENT DOCUMENTS

| | | |
|---|---|---|
| WO | WO 2008/137996 A1 | 11/2008 |
| WO | WO 2010/129369 A2 | 11/2010 |
| WO | WO2014039088 * | 3/2014 |

OTHER PUBLICATIONS

International Search Report dated Apr. 19, 2016 in connection with International Application No. PCT/KR2015/013855, 3 pages.

* cited by examiner

APPARATUS AND METHOD FOR CHARGING ELECTRONIC DEVICE HAVING BATTERY

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2014-0187911, filed on Dec. 24, 2014, which is hereby incorporated by reference for all purposes as if fully set forth herein.

TECHNICAL FIELD

Various embodiments of the present disclosure relate to a wireless charger for an electronic device having a battery and a method therefor.

BACKGROUND

An electronic device including a battery may charge the battery in a wired technique by using an external charger (such as terminal adaptor) or in a wireless technique by using a wireless charging pad. However, the wired and wireless charging techniques need to connect the chargers sequentially. For example, the chargers are connected in accordance with a priority of charging after identifying residual amounts of each battery. Furthermore, a plurality of chargers is needed to charge a plurality of devices. Therefore, efficient charging technique for an electronic device including a battery is needed.

SUMMARY

To address the above-discussed deficiencies, it is a primary object to provide an electronic device according to various embodiments of the present disclosure includes a wireless charger, and a charging operation could be performed by exchanging charging scores of electronic devices connected through the wireless charger.

If a connection to the wireless charger is detected, the electronic device can calculate charging scores in order to distribute a residual amount of a battery, and decide a charging mode or a charged mode of the electronic device by exchanging the charging scores with another electronic device. The electronic device can perform a charging operation or a charged operation through the wireless charger in the decided charging mode or charged mode.

A method for operating an electronic device according to various embodiments of the present disclosure may include receiving information related to a second battery from an external electronic device having the second battery by an electronic device having a first battery and a charger for charging the first battery; and deciding at least one of: 1) receiving an electric power from the external electronic device to the electronic device, 2) supplying an electric power from the electronic device to the external electronic device, or 3) not transferring an electric power between the electronic device and the external electronic device, by the electronic device based at least one of the information related to the second battery or information related to the first battery.

Another method for operating an electronic device according to various embodiments of the present disclosure may include transmitting information related to a first battery from an electronic device having the first battery to an external electronic device having a second battery; and receiving a signal or an indication configured to indicate at least one of: 1) receiving an electric power from the external electronic device to the electronic device, 2) supplying an electric power from the electronic device to the external electronic device, or 3) not transferring an electric power between the electronic device and the external electronic device.

An electronic device according to various embodiments of the present disclosure may include a first battery, a charger configured to charge the first battery by using an external power, a wireless charger configured to perform a wireless charging between a second battery of an external electronic device and the first battery, a communication unit configured to receive information related to the second battery from the external electronic device having the second battery, a control unit configured to decide at least one operation of receiving an electric power from the external electronic device through the communication unit based on at least one of information related to the second battery or information related to the first battery, supplying an electric power to the external electronic device, or not transferring an electric power between the electronic device and the external electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
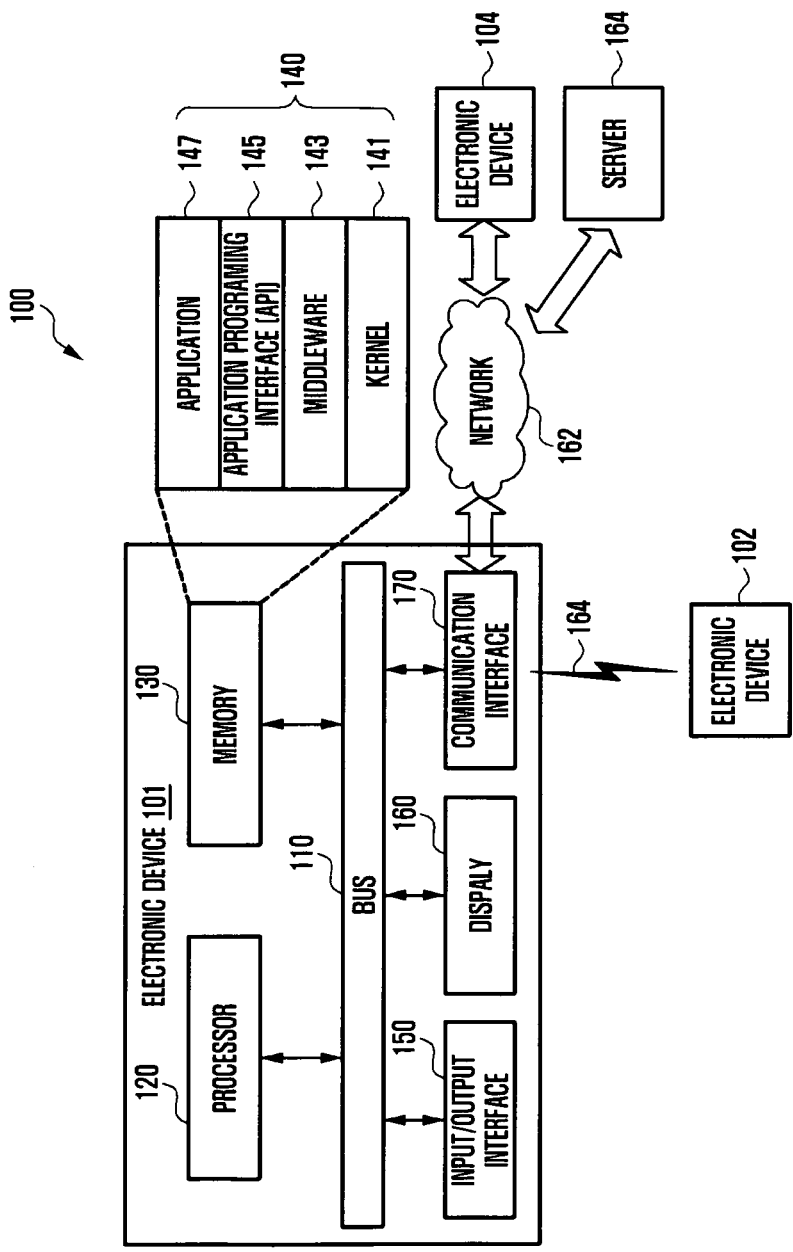
FIG. 1 is a block diagram illustrating an electronic device in a network environment according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component there between. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (such as an air-conditioner, vacuum, an oven, a microwave, a washing machine, an air cleaner, and the like), an artificial intelligence robot, a television (TV), a digital video disk (DVD) player, an audio device, various medical devices (such as magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (such as SAMSUNG HOMESYNC™, APPLE TV™, GOOGLETV™, or the like), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, the electronic device 100 includes a bus 110, a processor 120, a memory 130, a user input module 140, a display module 150, a communication module 160, and other similar and/or suitable components.

The bus 110 is a circuit that interconnects the above-described elements and delivers a communication (such as a control message) between the above-described elements.

The processor 120 may receive commands from the above-described other elements (such as the memory 130, the user input module 140, the display module 150, the communication module 160, etc.) through the bus 110, interprets the received commands, and executes calculation or data processing according to the interpreted commands.

The memory 130 stores commands or data received from the processor 120 or other elements (such as the user input module 140, the display module 150, the communication module 160, etc.) or generated by the processor 120 or the other elements. The memory 130 includes programming modules, such as a kernel 131, middleware 132, an application programming interface (API) 133, an application 134, and the like. Each of the above-described programming modules may be implemented in software, firmware, hardware, or a combination of two or more thereof.

The kernel 131 controls or manage system resources (such as the bus 110, the processor 120, the memory 130, etc.) used to execute operations or functions implemented by other programming modules (such as the middleware 132, the API 133, and the application 134). Also, the kernel 131 provides an interface capable of accessing and controlling or managing the individual elements of the electronic device 100 by using the middleware 132, the API 133, or the application 134.

The middleware 132 serves to go between the API 133 or the application 134 and the kernel 131 in such a manner that the API 133 or the application 134 communicates with the kernel 131 and exchanges data therewith. Also, in relation to work requests received from one or more applications 134 and/or the middleware 132, for example, performs load balancing of the work requests by using a method of assigning a priority, in which system resources (such as the bus 110, the processor 120, the memory 130, etc.) of the electronic device 100 are used, to at least one of the one or more applications 134.

The API 133 is an interface through which the application 134 is capable of controlling a function provided by the kernel 131 or the middleware 132, and includes, for example, at least one interface or function for file control, window control, image processing, character control, or the like.

The user input module 140, for example, receives a command or data as input from a user, and delivers the received command or data to the processor 120 or the memory 130 through the bus 110. The display module 150 may display a video, an image; data, or the like to the user.

The communication module 160 connects communication between another electronic device 102 and the electronic device 100. The communication module 160 supports a predetermined short-range communication protocol (such as Wi-Fi, Bluetooth (BT), and near field communication (NFC)), or predetermined network communication 162 (such as the Internet, a local area network (LAN), a wide area network (WAN), a telecommunication network, a cellular network, a satellite network, a plain old telephone service (POTS), or the like). Each of the electronic devices 102 and 104 is a device that is identical (such as of an identical type) to or different (such as of a different type) from the electronic device 100. Further, the communication module 160 connects communication between a server 164 and the electronic device 100 via the network 162.

Figure 2:
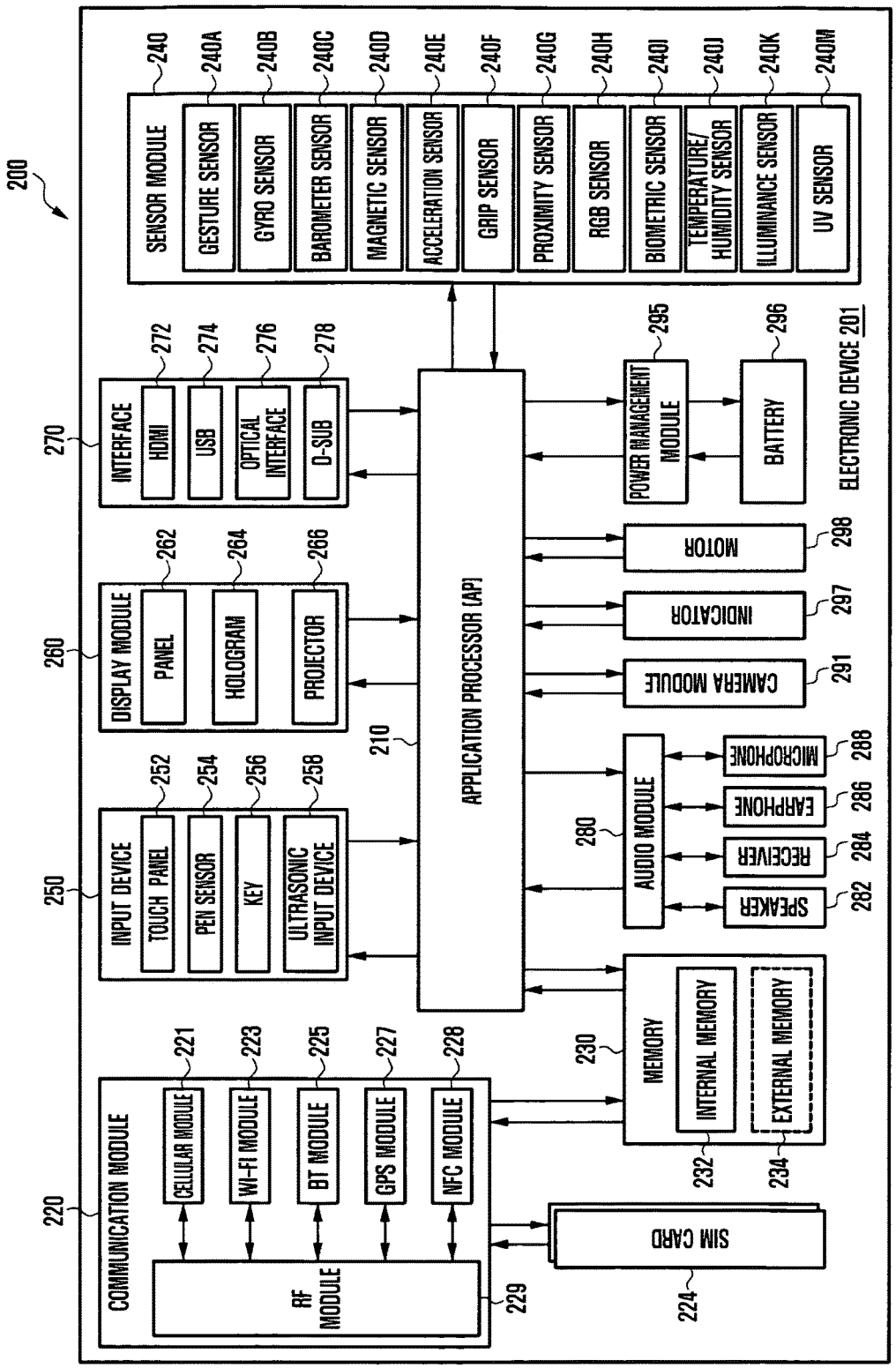
FIG. 2 is a block diagram illustrating a configuration of an electronic device according to various embodiments of the present disclosure.

FIG. 2 is a block diagram 200 illustrating a configuration of an electronic device 201 according to an embodiment of the present disclosure.

The hardware 200 is, for example, the electronic device 101 illustrated in FIG. 1.

Referring to FIG. 2, the electronic device includes one or more processors 210, a communication module 220, a subscriber identification module (SIM) card 224, a memory 230, a sensor module 240, a input device 250, a display module 260, an interface 270, an audio module 280, a camera module 291, a power management module 295, a battery 296, an indicator 297, a motor 298 and any other similar and/or suitable components.

The application processor (AP) 210 (such as the processor 120) includes one or more application processors (APs), or one or more communication processors (CPs). The processor 210 is, for example, the processor 120 illustrated in FIG. 1. The AP 210 is illustrated as being included in the processor 210 in FIG. 2, but is included in different integrated circuit (IC) packages, respectively. According to an embodiment of the present disclosure, the AP 210 is included in one IC package.

The AP 210 executes an operating system (OS) or an application program, and thereby controls multiple hardware or software elements connected to the AP 210 and performs processing of and arithmetic operations on various data including multimedia data. The AP 210 is implemented by, for example, a system on chip (SoC). According to an embodiment of the present disclosure, the AP 210 further includes a graphical processing unit (GPU) (not illustrated).

The AP 210 manages a data line and may convert a communication protocol in the case of communication between the electronic device (such as the electronic device 100) including the hardware 200 and different electronic devices connected to the electronic device through the network. The AP 210 is implemented by, for example, a SoC. According to an embodiment of the present disclosure, the AP 210 performs at least some of multimedia control functions. The AP 210, for example, distinguishes and authenticates a terminal in a communication network by using a subscriber identification module (such as the SIM card 224). Also, the AP 210 provides the user with services, such as a voice telephony call, a video telephony call, a text message, packet data, and the like.

Further, the AP 210 controls the transmission and reception of data by the communication module 220. In FIG. 2, the elements such as the AP 220, the power management module 295, the memory 230, and the like are illustrated as elements separate from the AP 210. However, according to an embodiment of the present disclosure, the AP 210 includes at least some (such as the CP) of the above-described elements.

According to an embodiment of the present disclosure, the AP 210 loads, to a volatile memory, a command or data received from at least one of a non-volatile memory and other elements connected to each of the AP 210, and process the loaded command or data. Also, the AP 210 stores, in a non-volatile memory, data received from or generated by at least one of the other elements.

The SIM card 224 is a card implementing a subscriber identification module, and is inserted into a slot formed in a particular portion of the electronic device 100. The SIM card 224 includes unique identification information (such as integrated circuit card identifier (ICCID)) or subscriber information (such as international mobile subscriber identity (IMSI)).

The memory 230 includes an internal memory 232 and an external memory 234. The memory 230 is, for example, the memory 130 illustrated in FIG. 1. The internal memory 232 includes, for example, at least one of a volatile memory (such as a dynamic RAM (DRAM), a static RAM (SRAM), a synchronous dynamic RAM (SDRAM), etc.), and a non-volatile memory (such as a one time programmable ROM (OTPROM), a programmable ROM (PROM), an erasable and programmable ROM (EPROM), an electrically erasable and programmable ROM (EEPROM), a mask ROM, a flash ROM, a Not AND (NAND) flash memory, a Not OR (NOR) flash memory, etc.). According to an embodiment of the present disclosure, the internal memory 232 is in the form of a Solid State Drive (SSD). The external memory 234 further includes a flash drive, for example, a compact flash (CF), a secure digital (SD), a micro-secure digital (Micro-SD), a mini-secure digital (Mini-SD), an extreme digital (xD), a memory stick, or the like.

The communication module 220 includes a cellular module 221, a wireless communication module 223 or a radio frequency (RF) module 229. The communication module 220 is, for example, the communication interface 170 illustrated in FIG. 1. The communication module 220 includes, for example, a Wi-Fi part 223, a BT part 225, a GPS part 227, or a NFC part 229. For example, the wireless communication module 220 provides a wireless communication function by using a radio frequency. Additionally or alternatively, the wireless communication module 220 includes a network interface (such as a LAN card), a modulator/demodulator (modem), or the like for connecting the hardware 200 to a network (such as the Internet, a LAN, a WAN, a telecommunication network, a cellular network, a satellite network, a POTS, or the like).

The RF module 229 is used for transmission and reception of data, for example, transmission and reception of RF signals or called electronic signals. Although not illustrated, the RF unit 229 includes, for example, a transceiver, a power amplifier module (PAM), a frequency filter, a low noise amplifier (LNA), or the like. Also, the RF module 229 further include a component for transmitting and receiving electromagnetic waves in a free space in a wireless communication, for example, a conductor, a conductive wire, or the like.

The sensor module 240 includes, for example, at least one of a gesture sensor 240A, a gyro sensor 240B, an barometer sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and a Ultra Violet (UV) sensor 240M. The sensor module 240 measures a physical quantity or senses an operating state of the electronic device 100, and converts the measured or sensed information to an electrical signal. Additionally/alternatively, the sensor module 240 includes, for example, an E-nose sensor (not illustrated), an Electro-MyoGraphy (EMG) sensor (not illustrated), an ElectroEn-cephaloGram (EEG) sensor (not illustrated), an ElectroCardiogram (ECG) sensor (not illustrated), a fingerprint sensor (not illustrated), and the like. Additionally or alternatively, the sensor module 240 includes, for example, an E-nose sensor (not illustrated), an EMG sensor (not illustrated), an EEG sensor (not illustrated), an ECG sensor (not illustrated), a fingerprint sensor, and the like. The sensor module 240 further includes a control circuit (not illustrated) for controlling one or more sensors included therein.

The input device 250 includes a touch panel 252, a pen sensor 254 (such as a digital pen sensor), keys 256, and an ultrasonic input unit 258. The input device 250 is, for example, the user input module 140 illustrated in FIG. 1. The touch panel 252 recognizes a touch input in at least one of, for example, a capacitive scheme, a resistive scheme, an infrared scheme, and an acoustic wave scheme. Also, the touch panel 252 further includes a controller (not illustrated). In the capacitive type, the touch panel 252 is capable of recognizing proximity as well as a direct touch. The touch panel 252 further includes a tactile layer (not illustrated). In this event, the touch panel 252 provides a tactile response to the user.

The pen sensor 254 (such as a digital pen sensor), for example, is implemented by using a method identical or similar to a method of receiving a touch input from the user, or by using a separate sheet for recognition. For example, a key pad or a touch key is used as the keys 256. The ultrasonic input unit 258 enables the terminal to sense a sound wave by using a microphone (such as a microphone 288) of the terminal through a pen generating an ultrasonic signal, and to identify data. The ultrasonic input unit 258 is capable of wireless recognition. According to an embodiment of the present disclosure, the hardware 200 receives a user input from an external device (such as a network, a computer, or a server), that is connected to the communication module 230, through the communication module 230.

The display module 260 includes a panel 262, a hologram 264, or projector 266. The display module 260 is, for example, the display module 150 illustrated in FIG. 1. The panel 262 is, for example, a liquid crystal display (LCD) and an active matrix organic light emitting diode (AM-OLED) display, and the like. The panel 262 is implemented so as to be, for example, flexible, transparent, or wearable. The panel 262 includes the touch panel 252 and one module. The hologram 264 displays a three-dimensional image in the air by using interference of light. According to an embodiment of the present disclosure, the display module 260 further includes a control circuit for controlling the panel 262 or the hologram 264.

The interface 270 includes, for example, a high-definition multimedia interface (HDMI) 272, a universal serial bus (USB) 274, an optical interface 276, and a d-subminiature (D-sub) 278. Additionally or alternatively, the interface 270 includes, for example, SD/multi-media card (MMC) (not illustrated) or infrared data association (IrDA) (not illustrated).

The audio codec 280 bi-directionally converts between a voice and an electrical signal. The audio codec 280 converts voice information that is input to or output from the audio codec 280, through, for example, a speaker 282, a receiver 284, an earphone 286, the microphone 288 or the like.

The camera module 291 captures an image and a moving image. According to an embodiment, the camera module 291 includes one or more image sensors (such as a front lens or a back lens), an image signal processor (ISP) (not illustrated), and a flash LED (not illustrated).

The power management module 295 manages power of the hardware 200. Although not illustrated, the power management module 295 includes, for example, a power management integrated circuit (PMIC), a charger integrated circuit (IC), or a battery fuel gauge.

The PMIC is mounted to, for example, an IC or a SoC semiconductor. Charging methods are classified into a wired charging method and a wireless charging method. The charger IC charges a battery, and may prevent an overvoltage or an overcurrent from a charger to the battery. According to an embodiment of the present disclosure, the charger IC includes a charger IC for at least one of the wired charging method and the wireless charging method. Examples of the wireless charging method include a magnetic resonance method, a magnetic induction method, an electromagnetic method, and the like. Additional circuits (such as a coil loop, a resonance circuit, a rectifier, etc.) for wireless charging are added in order to perform the wireless charging.

The battery fuel gauge measures, for example, a residual quantity of the battery 296, or a voltage, a current or a temperature during the charging. The battery 296 supplies power by generating electricity, and is, for example, a rechargeable battery.

The indicator 297 indicates particular states of the hardware 200 or a part (such as the AP 211) of the hardware 200, for example, a booting state, a message state, a charging state and the like. The motor 298 converts an electrical signal into a mechanical vibration. The processor 210 controls the sensor module 240.

Although not illustrated, the hardware 200 includes a processing unit (such as a GPU) for supporting a module TV. The processing unit for supporting a module TV processes media data according to standards such as, for example, digital multimedia broadcasting (DMB), digital video broadcasting (DVB), media flow, and the like. Each of the above-described elements of the hardware 200 according to an embodiment of the present disclosure includes one or more components, and the name of the relevant element changes depending on the type of electronic device. The hardware 200 according to an embodiment of the present disclosure includes at least one of the above-described elements. Some of the above-described elements are omitted from the hardware 200, or the hardware 200 further includes additional elements. Also, some of the elements of the hardware 200 according to an embodiment of the present disclosure is combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Figure 3:
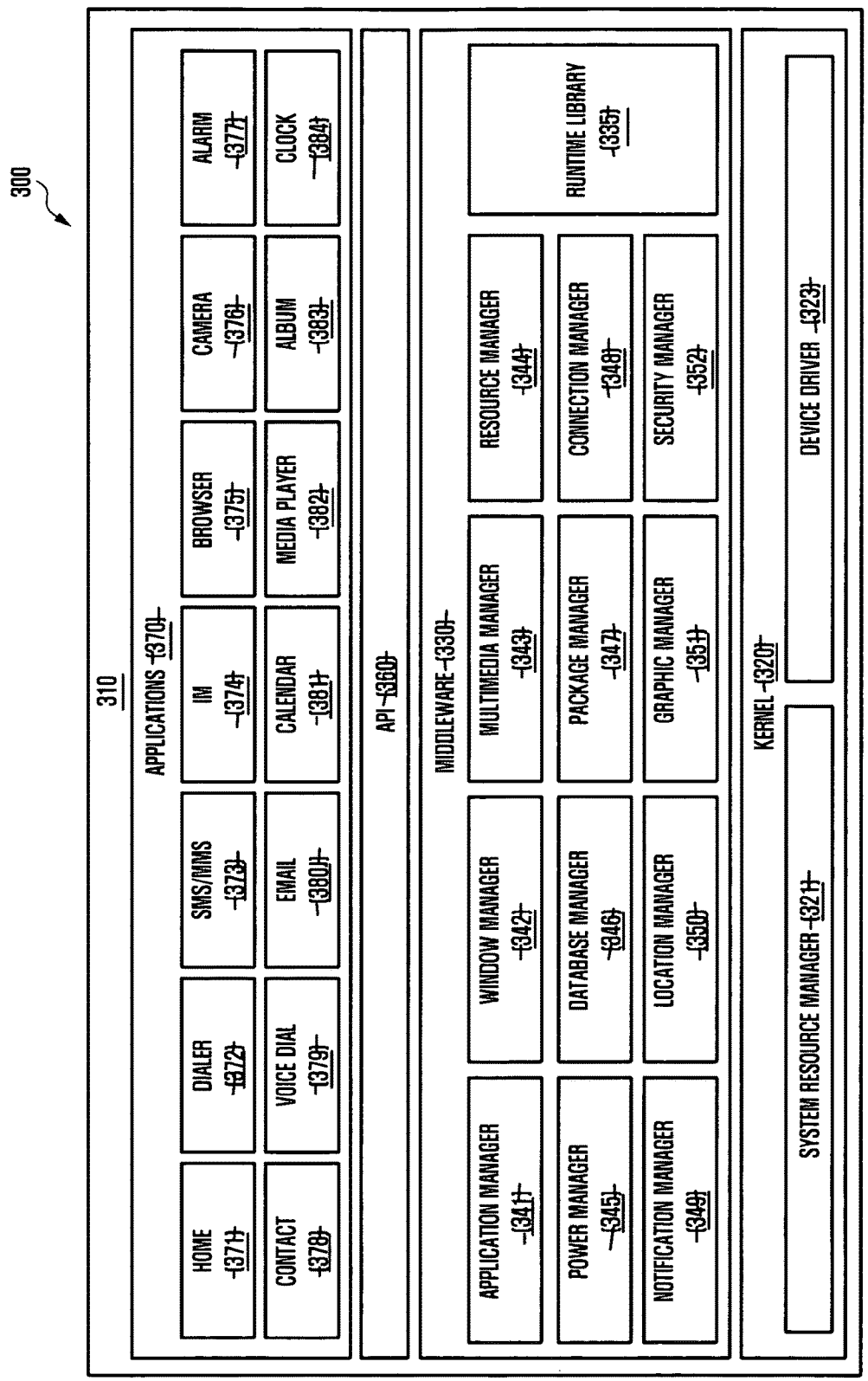
FIG. 3 is another block diagram illustrating a configuration of a program module according to various embodiments of the present disclosure.

FIG. 3 is a block diagram illustrating a configuration of a programming module 300 according to an embodiment of the present disclosure.

The programming module 300 is included (or stored) in the electronic device 100 (such as the memory 130) or is included (or stored) in the electronic device 200 (such as the memory 230) illustrated in FIG. 1. At least a part of the programming module 300 is implemented in software, firmware, hardware, or a combination of two or more thereof. The programming module 300 is implemented in hardware (such as the hardware 200), and may include an OS controlling resources related to an electronic device (such as the electronic device 100) and/or various applications (such as an application 370) executed in the OS. For example, the OS may be Android, iOS, Windows, Symbian, Tizen, Bada, and the like.

Referring to FIG. 3, the programming module 300 includes a kernel 310, a middleware 330, an API 360, and/or the application 370.

The kernel 310 (such as the kernel 131) includes a system resource manager 311 and/or a device driver 312. The system resource manager 311 includes, for example, a process manager (not illustrated), a memory manager (not illustrated), and a file system manager (not illustrated). The system resource manager 311 performs the control, allocation, recovery, and/or the like of system resources. The device driver 312 includes, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 includes an Inter-Process Communication (IPC) driver (not illustrated).

The middleware 330 includes multiple modules previously implemented so as to provide a function used in common by the applications 370. Also, the middleware 330 provides a function to the applications 370 through the API 360 in order to enable the applications 370 to efficiently use limited system resources within the electronic device. For example, as illustrated in FIG. 3, the middleware 330 (such as the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 includes, for example, a library module used by a compiler, in order to add a new function by using a programming language during the execution of the application 370. According to an embodiment of the present disclosure, the runtime library 335 performs functions that are related to input and output, the management of a memory, an arithmetic function, and/or the like.

The application manager 341 manages, for example, a life cycle of at least one of the applications 370. The window manager 342 manages GUI resources used on the screen. The multimedia manager 343 may detect a format used to reproduce various media files and encodes or decodes a media file through a codec appropriate for the relevant format. The resource manager 344 manages resources, such as a source code, a memory, a storage space, and/or the like of at least one of the applications 370.

The power manager 345 operates together with a basic input/output system (BIOS), may manage a battery or power, and provides power information and the like used for an operation. The database manager 346 manages a database in such a manner as to enable the generation, search and/or change of the database to be used by at least one of the applications 370. The package manager 347 manages the installation and/or update of an application distributed in the form of a package file.

The connectivity manager 348 manages a wireless connectivity such as, for example, Wi-Fi and Bluetooth. The notification manager 349 displays or reports, to the user, an event such as an arrival message, an appointment, a proximity alarm, and the like in such a manner as not to disturb the user. The location manager 350 manages location information of the electronic device. The graphic manager 351 manages a graphic effect, which is to be provided to the user, and/or a user interface related to the graphic effect. The security manager 352 provides various security functions used for system security, user authentication, and the like.

According to an embodiment of the present disclosure, when the electronic device (such as the electronic device 100) has a telephone function, the middleware 330 further includes a telephony manager (not illustrated) for managing a voice telephony call function and/or a video telephony call function of the electronic device.

The middleware 330 generates and use a new middleware module through various functional combinations of the above-described internal element modules. The middleware 330 provides modules specialized according to types of OSs in order to provide differentiated functions. Also, the middleware 330 dynamically deletes some of the existing elements, or adds new elements. Accordingly, the middleware 330 omits some of the elements described in the various embodiments of the present disclosure, further includes other elements, or replaces the some of the elements with elements, each of which performs a similar function and has a different name.

The API 360 (such as the API 133) is a set of API programming functions, and is provided with a different configuration according to an OS. In the case of Android or iOS, for example, one API set is provided to each platform. In the case of Tizen, for example, two or more API sets is provided to each platform.

The applications 370 (such as the applications 134) include, for example, a preloaded application and/or a third party application. The applications 370 (such as the applications 134) include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 is implemented by instructions stored in a non-transitory computer-readable storage medium. When the instructions are executed by one or more processors (such as the one or more processors 210), the one or more processors perform functions corresponding to the instructions. The non-transitory computer-readable storage medium is, for example, the memory 220. At least a part of the programming module 300 is implemented (such as executed) by, for example, the one or more processors 210. At least a part of the programming module 300 includes, for example, a module, a program, a routine, a set of instructions, and/or a process for performing one or more functions.

Names of the elements of the programming module (such as the programming module 300) according to an embodiment of the present disclosure changes depending on the type of OS. The programming module according to an embodiment of the present disclosure includes one or more of the above-described elements. Alternatively, some of the above-described elements are omitted from the programming module. Alternatively, the programming module further includes additional elements. The operations performed by the programming module or other elements according to an embodiment of the present disclosure are processed in a sequential method, a parallel method, a repetitive method, or a heuristic method. Also, some of the operations are omitted, or other operations are be added to the operations.

Figure 4:
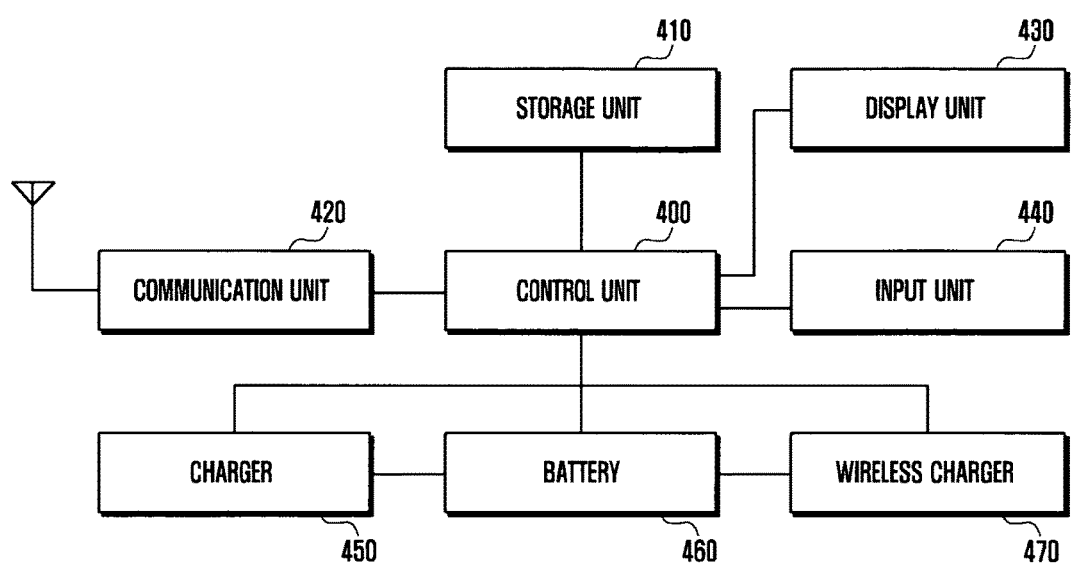
FIG. 4 is another block diagram illustrating a configuration of an electronic device according to various embodiments of the present disclosure.

FIG. 4 is a block diagram illustrating a configuration of an electronic device according to various embodiments of the present disclosure.

Referring to FIG. 4, the electronic device is configured with a control unit 400, storage unit 410, communication unit 420, display unit 430, input unit 440, charger 450, battery 460, and wireless charger 470.

The battery 460 supplies an electric power to the electronic device. The charger 450 is be connected to an external power by a wired or wireless method. The charger 450 converts the external power to a charging power for the battery 460, and the battery 460 is charged with the power output by the charger 450.

The wireless charger 470 supplies a battery power to a battery of another electronic device in a wireless method. Here, the wireless charger 470 utilizes a magnetic induction method, magnetic resonance method, electromagnetic wave method, or other method. The magnetic induction method utilizes an electromagnetic induction principle that generates a magnetic field at a coil of a transmitter and a current is induced at a coil of a receiver by the magnetic field. In the electromagnetic wave method, a receiver catches an electromagnetic wave and converts it to an electric power by using an antenna and a rectifier, if an electromagnetic waves is generated by a transmitter. In the magnetic resonance method, a magnetic field vibrating with a resonance frequency is generated at a coil of a transmitter, and a coil of a receiver having the same resonance frequency catches an intensively transmitted energy and converts it to an electric power.

The wireless charger 470 is installed in the electronic device, and supplies an electric power of the battery 460 to an external electronic device or charge the battery 460 by receiving a wireless power from the external electronic device in a wireless method. The wireless charger 470 is installed at the rear side or rear cover of a device. For example, the wireless charger 470 is located close to a wireless charger of an external electronic device or contact with the wireless charger of the external electronic device. Here, the battery 460 is called first battery, and the battery of the external electronic device is called second battery. If the wireless charger 470 is located close to the wireless charger of the external electronic device or contact with the wireless charger of the external electronic device, the electronic device supplies a charging power of the first battery to the external electronic device or charge the first battery by receiving a wireless power of the second battery supplied from the external electronic device in a wireless method.

The communication unit 420 receives information related to the second battery from the external electronic device having the second battery. The communication unit 420 includes a modem (such as modulator and demodulator) that connects to a base station, internet server, and/or external electronic device through a wireless link. The communication unit 420 includes one or more modems such as an long term evolution (LTE), wideband code division multiple access (WCDMA), global system for mobile communications (GSM), wireless fidelity (WiFi), Bluetooth, and near field communication (NFC). Further, the communication unit that receives information related to the second battery from the external electronic device having the second battery are configured with a Bluetooth and/or NFC system.

The control unit 400 controls general operations of the electronic device and a wireless charging operation by analyzing information related to a battery of an adjacent or contacted electronic device. For example. the control unit 400 decides to receive an electric power from the external electronic device, to supply an electric power to the external device, or not to transfer an electric power between the electronic device and the external electronic device through the wireless charger 470 based at least one of information related to the battery (such as second battery) of the external electronic device or information related to the battery 460 (such as first battery).

The storage unit 410 includes a program memory for storing an operating program and a wireless charging program of the electronic device, and a data memory for storing tables for the operations of the electronic device and data generated while executing the programs.

The display unit 430 displays information of an application executing under the control of the control unit 400. The display unit 430 is configured with an LCD or an OLED. The input unit 440 is configured with a capacitive type or a resistive type, and outputs location information of a user touch (such as finger touch) and/or an interaction to the control unit 400. The input unit 440 further includes an EMR sensor pad, and can output to the control unit 400 by detecting a pen touch input. The display unit 430 and the input unit 440 are configured in an integral form.

The electronic device having the wireless charger 470 internally installs the wireless charger 470. For example, the wireless charger 470 is installed at the rear side or rear cover of the electronic device. The wireless charger 470 includes a coil for converting an electric current and transmitting the electric current in a wireless method. The main components of the wireless charger 470 for transmitting the electric current are an electric current supplier and a coil.

The electronic device includes a wireless charger 470 configured to perform a wireless charging operation. The wireless charging operation of the wireless charger 470 is performed in various methods using an electromagnetic induction principle. The wireless charger 470 includes a coil, charger, and/or power supply. The control unit 400 of the electronic device includes an algorithm for calculating a charging amount and processing a charging score to automatically distribute a charging amount for the battery 460. Namely, the control unit 400 generates a charging score by calculating a charging amount of the battery 460. If a connection to another electronic device is detected, the control unit 400 receives a charging score of the connected electronic device. The control unit 400 decides a charging mode or a charged mode by comparing and analyzing its own charging score and a charging score received from another electronic device. For this, the electronic device includes a communication unit 420 configured to exchange charging scores between the electronic devices. The communication unit 420 is a near-field communication unit. The near-field communication unit is an NFC or BLE module.

Accordingly, the electronic device having the wireless charger 470 receives an electric power from another electronic device having a wireless charger or supplies an electric power to another electronic device. Namely, an electronic device to be charged sometimes is an electronic device to charge. If an external electronic device approaches close or contacts, the electronic device transmits charging information (hereafter, charging score) related to the battery 460 (such as first battery) through the communication unit 420, and receives a charging score related to a battery of an external electronic device through the communication unit 420. Subsequently, the control unit 400 decides a charging/charged mode for the electronic device by comparing and analyzing the charging scores of the first battery and the second battery. If decided as a charging device, the control unit 400 decides to supply an electric power of the battery 460 to an external electronic device through the wireless charger 470. If decided as a device to be charged, the control unit 400 decides to charge the battery 460 by using an electric power supplied from the external electronic device through the wireless charger 470. If the charging scores of the first battery and the second battery satisfy a predetermined condition (such as if charging amounts of the 2 batteries are balanced), the control unit 400 decides a non-transfer mode that doesn't transmit the electric power of the battery 460 so that the charging operation or the charged operation is not performed between the electronic devices.

Figure 5:
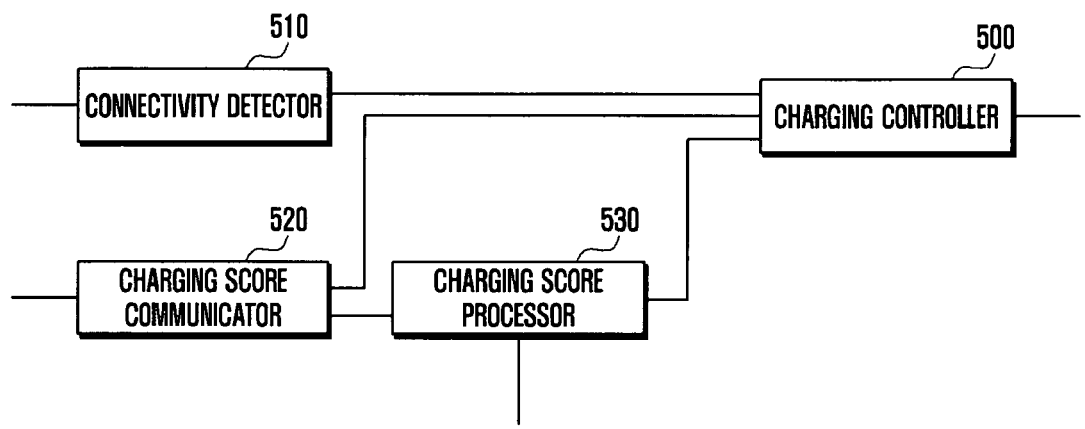
FIG. 5 is a block diagram illustrating a configuration of a control unit for controlling a connection and a charging between electronic devices according to various embodiments of the present disclosure.

FIG. 5 is a block diagram illustrating a configuration of a control unit for controlling a connection and a charging between electronic devices according to various embodiments of the present disclosure. The wireless charging controller is included in the control unit 400. The wireless charging controller includes a connectivity detector 510, charging score communicator 520, charging score processor 530, and charging controller 500.

Referring to FIG. 5, the connectivity detector 510 detects a connection with another electronic device. Here, the connectivity detector 510 includes a sensor such as a contact sensor. Further, the connectivity detector 510 operates as a communication unit. The communication unit for detecting a connection is a near-field communication unit, and the near-field communication unit decides a connection state by measuring an intensity of signal received from another terminal. Further, the connectivity detector 510 utilizes a coil of the wireless charger 470.

The charging score communicator 520 receives a charging score transmitted from another electronic device (such as information related to a battery (such as second battery) of another electronic device), and transmit a charging score of the battery 460 (such as first battery). The charging score communicator 520 operates when the connectivity detector 510 detects a connection with another electronic device.

The charging score processor 530 generates and processes a charging score by using at least one of a charging amount of the battery 460 and/or a charging factor. The charging score processor 530 operates when the connectivity detector 510 detects a connection with another electronic device.

The charging controller 500 decides a charging mode (such as a charging mode or charged mode) by analyzing a charging score of the battery 460 and a charging score of another electronic device. The charging controller 500 controls the charging score communicator 520 and the charging score processor 530 when the connectivity detector 510 detects a connection with another electronic device.

When connected to another electronic device, the charging score processor 530 detects a residual amount of the battery 460, and generate a charging score of the electronic device by combining the residual amount and charging factors of the battery 460. The charging score processor 530 transmits the generated charging score through the charging score communicator 520. The charging factor can include a capacity of the battery 460, and the charging score processor 530 calculates the residual amount and capacity of the battery 460 by using a predetermined weighted value and generate the charging score by adjusting the calculated residual amount and capacity of the battery 460 with a predetermined ratio (such as percentage).

Further, the charging factor further includes at least one of an emergency call, device location information, user preference, and usage frequency of a device. The charging score processor 530 calculates each charging factor with a weighted value and generate the charging score by processing the calculated value with a predetermined ratio (such as percentage).

If the charging factor include device location information, the charging score processor 530 calculates a residual amount of the battery 460, capacity of the battery 460, and device location information with a weighted value, and generate a charging score by converting to the calculated values to percentages. The device location information includes statistical information of device usage frequency at the current location. If the charging factor further includes a user preference, the charging score processor 530 calculates a residual amount of the battery 460, capacity of the battery 460, and user preference with a weighted value, and generate the charging score by converting to the calculated values to percentages. If the charging factor further includes device usage frequency information, the charging score processor 530 calculates the residual amount of the battery 460, capacity of the battery 460, and device usage frequency information with a weighted value, and generate the charging score by converting to the calculated values to percentages.

When connected to another electronic device, the charging controller 500 generates a charging score of the battery 460, and controls to exchange its own charging score and a charging score of another electronic device. The charging controller 500 decides a charging or charged mode of the battery 460 by analyzing its own charging score and the charging score of another electronic device. The charging or charged operation of the battery 460 is performed by controlling the wireless charger 470, and can be terminated if the charging scores satisfies a predetermined condition of the battery 460 charging or being charged.

When deciding a charging a or charged mode, the charging controller 500 compares a received charging score with its own charging score and decide the charging mode if its own charging score is greater than the received charging score, and decides the charged mode if the received charging score is greater than its own charging score. Here, the charging score has a relatively greater value when the residual amount of the battery 460 is small. However, if the charging score is set to have a smaller value when the residual amount of the battery 460 is small, the charging and charged operation can be performed adversely.

When performing a charging/charged function, the charging controller 500 controls the display unit 430 to display a charging state including at least one of a battery charging amount, estimated charging time, and charged amount of a device charging or being charged. The operation of the charging controller 500 displaying a charging/charged state is performed by at least one of displaying a popup window or displaying an indicator. While performing the charging/charged operation, the charging score processor 530 generates a new charging score according to a change of the charging amount of the battery 460. The charging controller 500 controls to transmit the new charging score to the other electronic device.

Further, while performing the charging/charged operation, the charging controller 500 compares a charging score received from another electronic device with its own charging score, and terminates the charging/charged operation if the received charging score and its own charging score satisfy a predetermined condition. Here, the predetermined condition is a value of which two charging scores are balanced or a critical value is set to the electronic device being charged.

Further, the electronic device performs an emergency charging. The emergency charging is a function of securing an electric power required to perform an emergency function (such as an emergency call and/or a predetermined major function of an electronic device). Here, the emergency function is a default function of an electronic device or a function set by a user. Accordingly, if the emergency function is set, the charging controller 500 checks whether another device is in an emergency charging mode when detecting a connection with another device, and performs the emergency charging operation if another device is in the emergency charging mode. If the emergency charging mode is set, the charging controller 500 performs operations of setting the device in the emergency charging mode to a charging mode and setting the other device to a charged mode.

The following Table 1 and Table 2 illustrate an example of generating a charging score of an electronic device according to various embodiments of the present disclosure. Table 1 shows examples of battery charging factors, and Table 2 shows charging scores generated according to the charging factors of Table 1.

TABLE 1

| | Mobile phone | Tablet | Smart watch | Smart ring | wireless charging auxiliary battery |
|---|---|---|---|---|---|
| Inter-charging attribute | Transmission & Reception | Transmission & Reception | Transmission & Reception | Reception only | Transmission only |
| Battery capacity | 2000 mA | 4000 mA | 300 mA | 50 mA | 10000 mA |
| Power gauge | Critical Low Mid High | Critical Low Mid High | Critical Low Mid High | Critical Low Mid High | Critical Low Mid High |
| Charging factor | Gauge Active state Time Location, Recent usage frequency TA insertion state | Gauge Active state Time Location Recent usage frequency TA insertion state | Gauge Active state Time Location Recent usage frequency TA insertion state Host function setting | Gauge Active state Time Location Recent usage frequency TA insertion state Host function setting | Gauge |

TABLE 2

```
if ( TA connected )
score = 100         // Always MAX score when charger connected
else
score = 0           // Initial value
score += 15 * (Battery size) // Battery capacity 15% (0 ~ 1.0)
score += 15 * (Power gauge) // Current power gauge value 15% (0 ~ 1.0)
score += 20 * (Emergency)   // Emergency call enabled device 20%
(0 or 1)
score += 15 * (Usage)       // Usage frequency for recent 3 hours
15% (0 ~ 1.0)
score += 10 * (Location stat) // statistical information at current
location 10% (~1)
score += 25 * (User preference) // User preference 25% (0 ~ 1.0)
```

Figure 6:
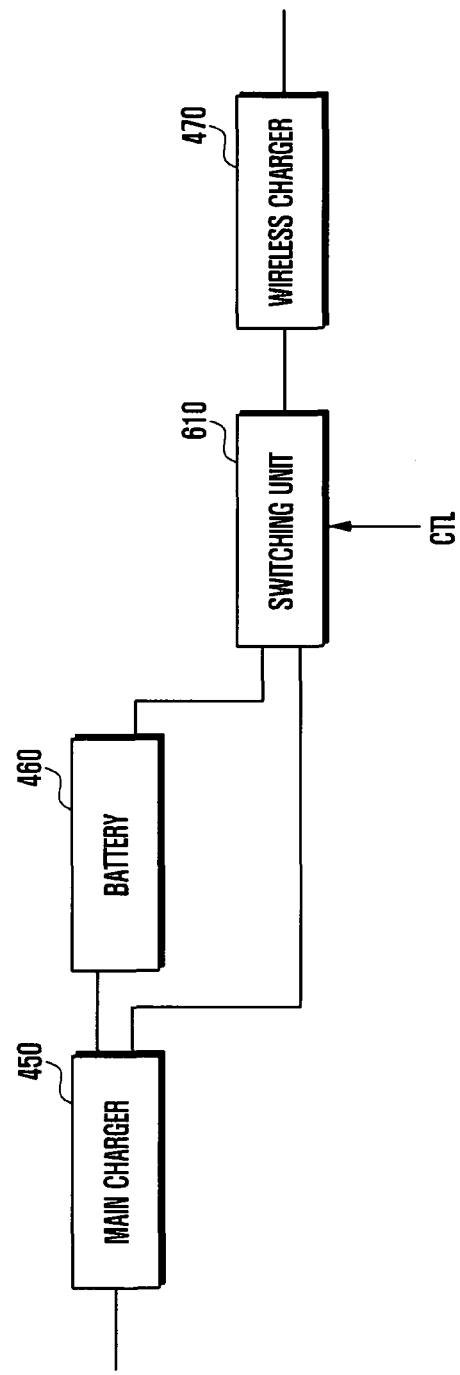
FIG. 6 is a block diagram illustrating a configuration of a wireless charger and a battery in an electronic device according to various embodiments of the present disclosure.

FIG. 6 is a block diagram illustrating a configuration of a wireless charger and a battery in an electronic device according to various embodiments of the present disclosure.

Referring to FIG. 6, the main charger 450 is connected to an external power (such as a home power or a charging battery), and performs an operation of converting the external power to a power level of the battery 460 of the electronic device. The main charger 450 uses a wired or wireless method. The main charger 450 includes an AC/DC convertor for converting an alternating current to a direct current and a DC/DC convertor for converting the direct current to a direct current level of the battery 460.

A switching unit 610 connects the main charger 450 to the wireless charger 470 if the main charger 450 is connected to an external power, and connects the battery 460 to the wireless charger 470 if the main charger is not connected to the external power. The operation of the switching unit 610 is controlled by the control unit 400.

If the main charger 450 is connected to an external power, the control unit 400 outputs the power of the main charger to the wireless charger 470 by controlling the switching unit 610. Accordingly, if the main charger 450 is connected to an external power, the control unit 400 sets an electronic device connected to the external power to a charged mode, and set the other electronic device to a charging mode.

FIGS. 7A to 7E are illustrating examples of contacts between electronic devices and locations of wireless chargers.

Figure 7A:
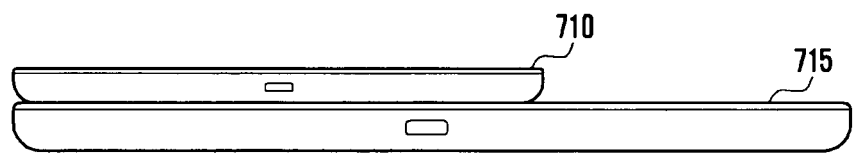
FIGS. 7A to 7E illustrate examples of contacts between an electronic device and a location of a wireless charger.
Figure 7B:
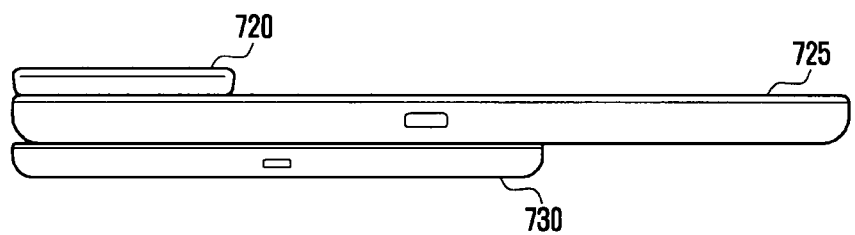

Referring to FIGS. 7A and 7B, a connection of the electronic device is performed in a contact or non-contact method. Further, the electronic device is connected to 2 or 3 electronic devices as shown by FIG. 7A, and the connections with the electronic devices is detected by a sensor. For example, the sensor is a connectivity detector 510 shown in FIG. 5.

FIG. 7A illustrates a state that electronic devices 710 and 715 are contacted each other. The sensor detects locations of the electronic devices, and the control unit 400 decides a charging/charged mode according to the location of the electronic device. For example, the control unit 400 decides to receive an electric power from the external electronic device 710 if the external electronic device 710 is located at the upper side of the electronic device 715 and to supply an electric power to the external electronic device 710 if the external electronic device 710 is located at the lower side of the electronic device 715. Alternatively, the control unit 400 decides to receive an electric power from the external electronic device 710 if the external electronic device 710 is located at the lower side of the electronic device 715 and to supply an electric power to the external electronic device 710 if the external electronic device 710 is located at the upper side of the electronic device 715.

Further, the sensor detects locations of connected devices and the number of connected devices (such as 3 or more devices). FIG. 7B illustrates a state that 3 electronic devices 720, 725, and 730 are contacted each other. The control unit 400 decides the number of connected devices by analyzing an output of the sensor, and decides so that a device having the greatest charging score charges a device having the smallest charging score and a device having the second greatest charging score charges a device having the second smallest charging score.

Figure 7C:
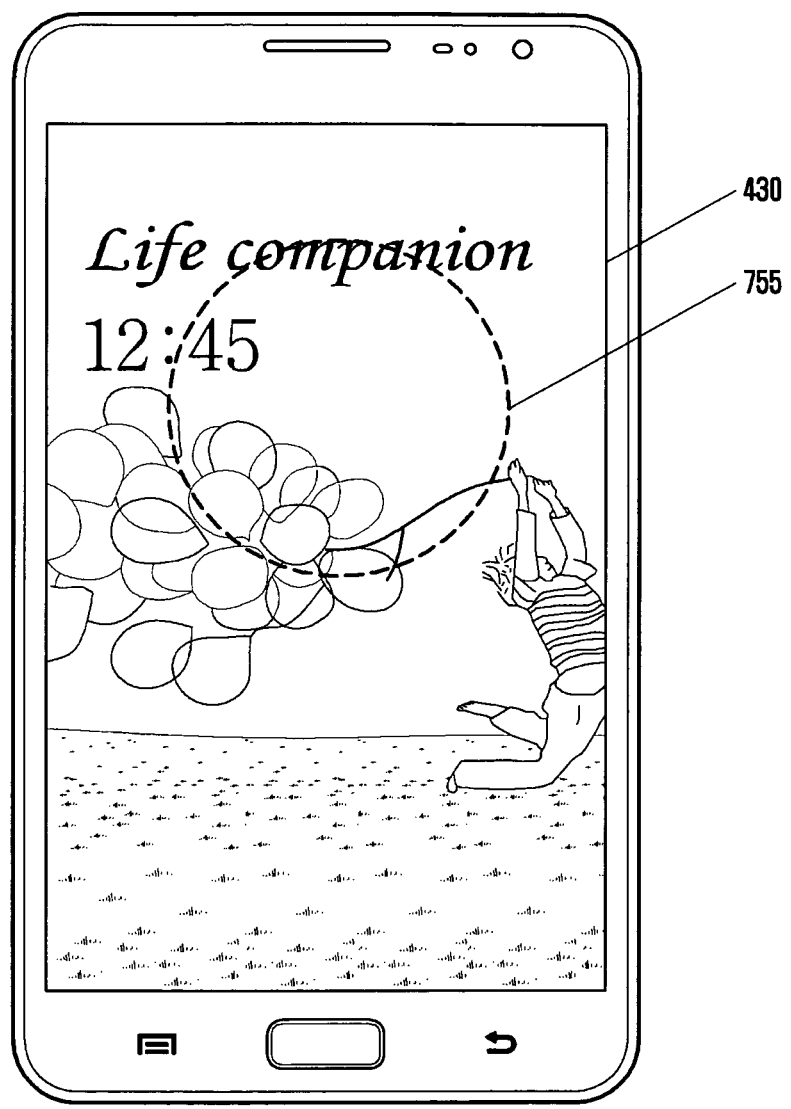
Figure 7D:
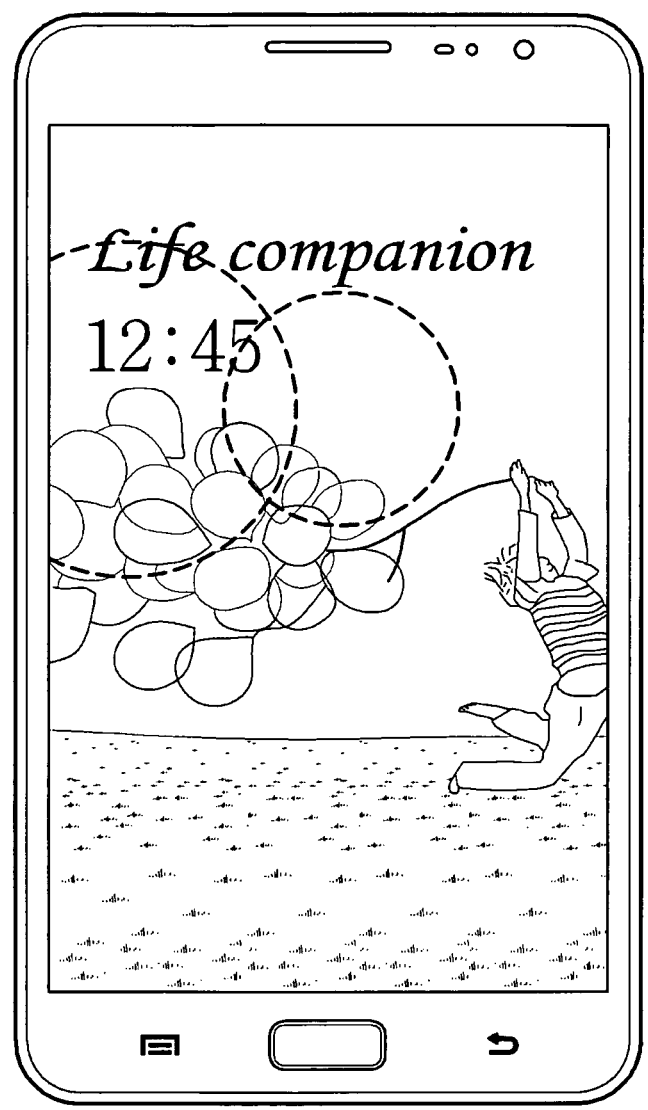
Figure 7E:
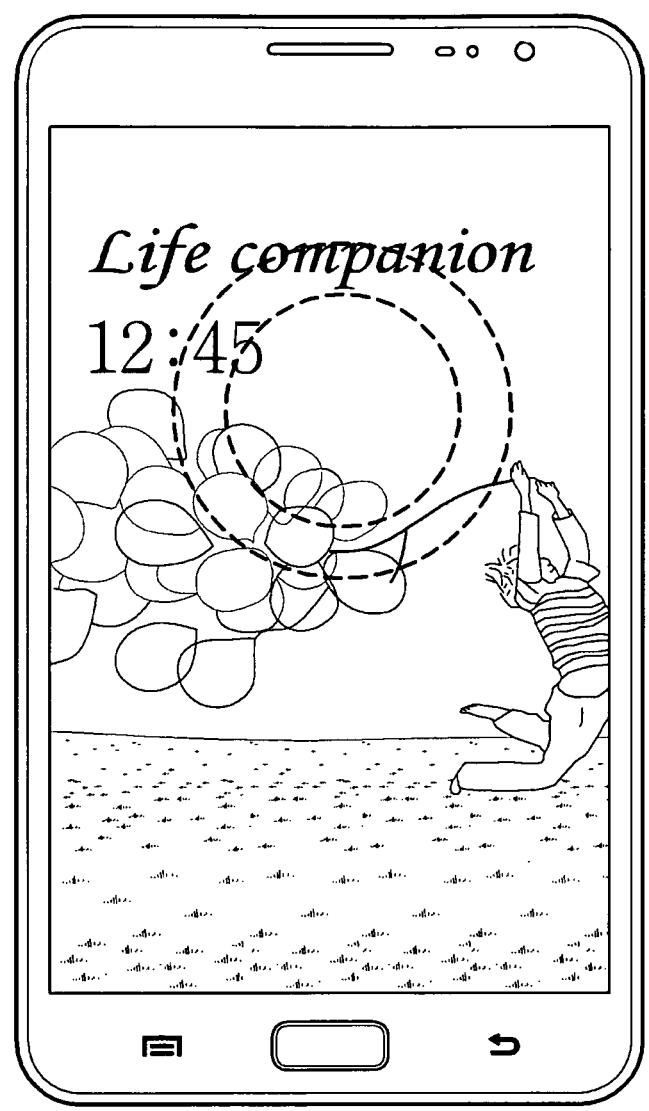

FIGS. 7C to 7E illustrate states that electronic devices are connected.

Referring to FIGS. 7C to 7E, while the electronic devices perform charging operations as shown by FIG. 7A or 7B, the control unit 400 controls the display unit 430 to display a location of a wireless charger as shown by reference number 755 of FIG. 7C. Here, the charging efficiency is improved by matching contact or connection locations of the wireless chargers each other. If the contact locations of the wireless chargers are not identical as shown by FIG. 7D, the control unit 400 controls the display unit 430 to display a guide image as shown by FIG. 7E so that the contact locations of the wireless chargers become identical.

Figure 8:
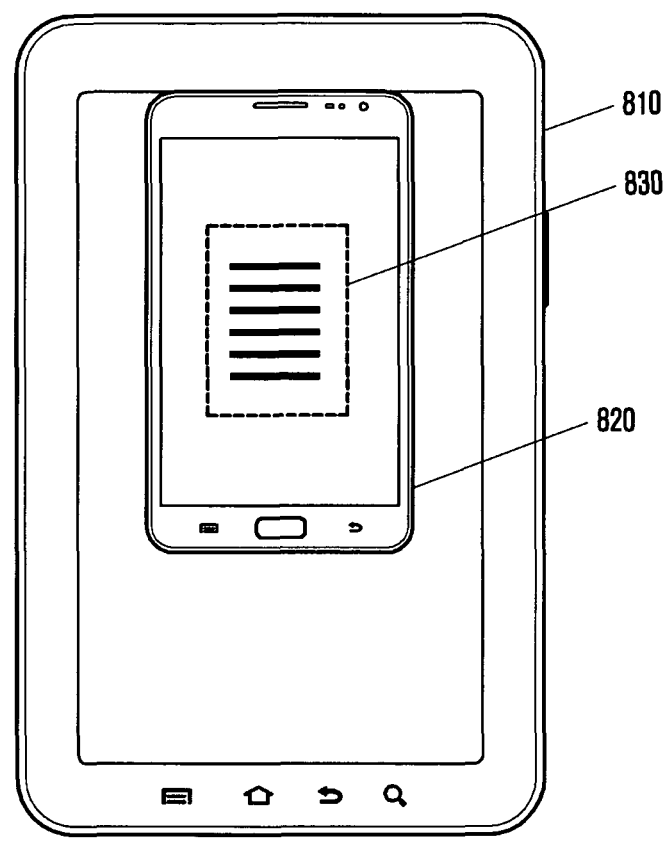
FIG. 8 is illustrate an example screen of displaying a charging state in an electronic device according to various embodiments of the present disclosure.

FIG. 8 is illustrating an example screen of displaying a charging state in an electronic device according to various embodiments of the present disclosure.

Referring to FIG. 8, while electronic devices 810 and 820 perform wireless charging operations by contacting each other, the control unit 400 controls to display a charging state through the electronic device 820 as shown by reference number 830 of FIG. 8. Here, the content of the display is charging state information including at least one of a battery charging amount of a device charging or being charged, estimated charging time, and charged amount. When displaying the charging state, the control unit 400 displays a popup window as shown by reference number 830 of FIG. 8 or in an indicator form.

Figure 9A:
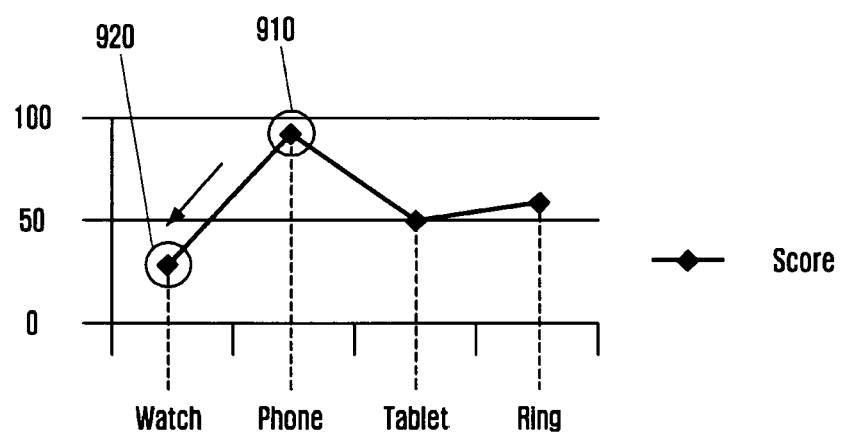
FIGS. 9A and 9B are graphs illustrating examples of deciding a charging/charged mode and completing a charging according to various embodiments of the present disclosure.
Figure 9B:
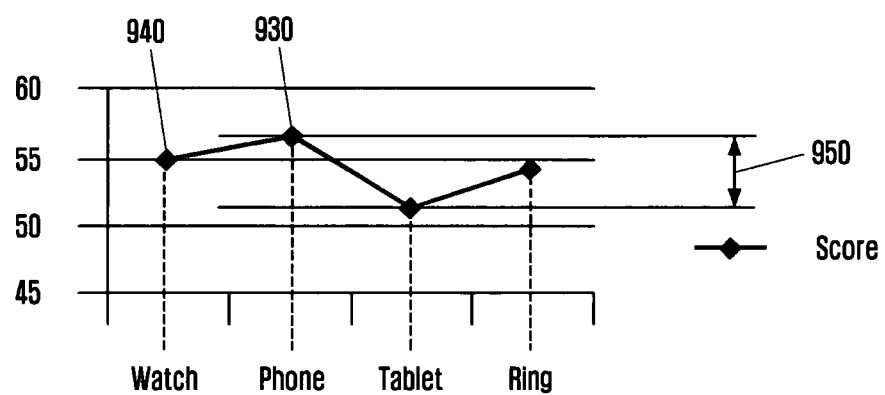

FIGS. 9A and 9B are graphs illustrating examples of deciding a charging/charged mode and completing a charging according to various embodiments of the present disclosure.

Referring to FIGS. 9A and 9B, if an electronic device (such as phone) having a charging score 910 and an electronic device (such as watch) having a charging score 920 are connected, both electronic devices exchanges the charging scores. Assuming that the charging score has a value proportional to a battery residual amount (such as the charging score has a greater value if the battery residual amount is greater), the battery power of the phone wirelessly charges the battery of the watch by contacting each other. Here, the wireless charging is terminated if the battery charging scores of the 2 electronic devices are balanced or a difference between the battery charging scores satisfy a predetermined condition. For example, if the difference 950 between the charging scores 930 and 940 is located within a predetermined range as shown in FIG. 9B, the charging operation of the electronic devices (such as a phone and a watch) is terminated.

Accordingly, the electronic devices performs wireless charging operations when an electronic device having a first battery and a charger for the first battery is connected to an external electronic device having a second battery (such as when a wireless charger contacts). If the 2 electronic devices are connected (or contacted), the electronic device operating by the first battery receives a charging score of the second battery from the external electronic device, and generate and transmit a charging score of the first battery to the external electronic device. Further, the electronic device decides to perform an operation of receiving an electric power from the external electronic device based on at least one of information related to the second battery or information related to the first battery, an operation of supplying an electric power from the electronic device to the external electronic device, or an operation of non-transferring between the electronic device and the external electronic device.

The electronic devices having a wireless charger performs a wireless charging operation by using a battery power. If electronic devices having a wireless charging function are located in a wirelessly chargeable range (such as if the electronic devices are stacked together), the charging operation is performed by analyzing charging scores of the batteries of the electronic devices. The electronic devices maintain the latest state by periodically updating the charging score through an algorithm (such as calculation formula). Further, the electronic devices generate their own charging scores when a connection to another external electronic device is detected and transmit (such as broadcast) the charging score to the external electronic device through a near-field communication unit. The charging score is transmitted with the minimum output only if it is in a wirelessly chargeable range, and thereby a current consumption of an RF transmission can be minimized. If sharing of charging scores is completed between adjacent devices by contacting or connecting to an external electronic device, the electronic devices decides a charging device and a device to be charged by comparing all the charging scores. The charging scores of each electronic device will continuously change according to a wireless charging and a specific discharge pattern, and thereby the charging device and the device to be charged is interchanged according to the change of charging scores.

While performing the charging/charged operation, the charging scores of electronic devices that initially have a big difference become balanced or come into a predetermined deviation range as the time elapses after starting the wireless charging. Accordingly, the electronic devices terminates the charging if the charging scores of the electronic devices become balanced or satisfy a predetermined critical value (such as difference), and a complete discharge of a specific electronic device is avoided as the result. The critical value for charging/charged amounts of each electronic device is predetermined so that the electronic devices may not continue to charge or be charged until the charging score becomes completely balanced.

Further, the electronic devices display a charging/charged state while performing the charging/charged operation. Namely, while performing the charging/charged operation, the control unit 400 controls the display unit 430 to display an estimated battery consumption, charging state, estimated charging time, and available charging amount of each electronic device. Here, the displaying method is performed by displaying an indicator or a popup window in the display unit 430 as described above. The display information further includes information of a connected electronic device and information of a currently charging electronic device.

Further, the wireless charging of an electronic device is performed by dynamically readjusting a charging score when an electronic device is disconnected while performing the charging/charged operation. For example, if an electronic device is disconnected while performing the charging operation in a state that 3 or more electronic devices are connected, the control unit 400 changes the charging/charged mode or re-perform the charging by re-analyzing the charging scores of the connected electronic devices.

Figure 10:
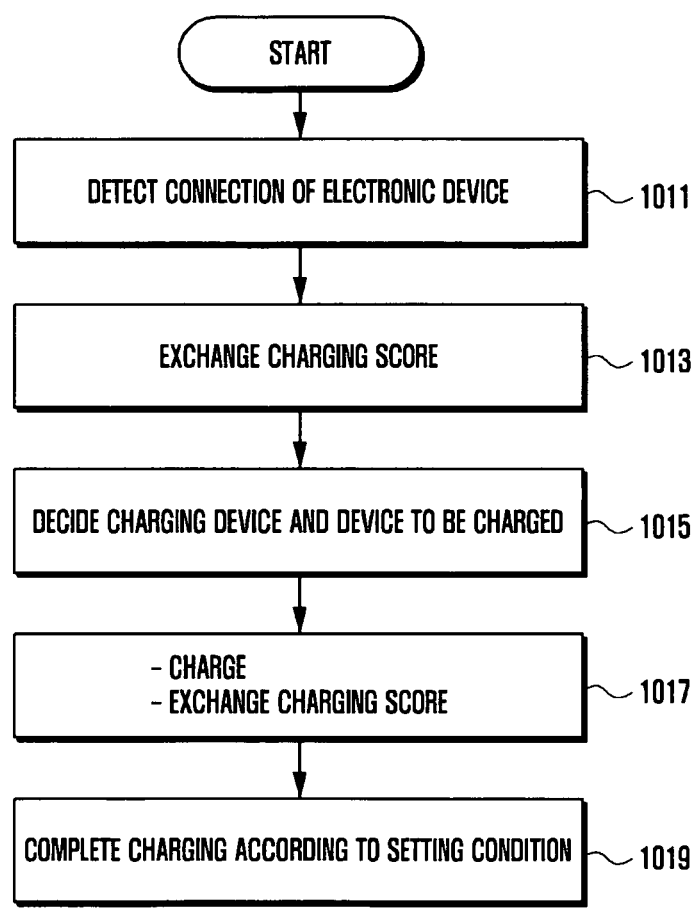
FIG. 10 is a flowchart illustrating a procedure of performing a wireless charging in an electronic device according to various embodiments of the present disclosure.

FIG. 10 is a flowchart illustrating a procedure of performing a wireless charging in an electronic device according to various embodiments of the present disclosure.

Referring to FIG. 10, if an external electronic device is connected, the control unit 400 detects a connection of the external electronic device at operation 1011, and exchanges charging scores with the connected external electronic device at operation 1013. The control unit 400 includes a connectivity detector 510 (such as sensor), and the connectivity detector 510 detects the connection of the external electronic device when the wireless chargers 470 contacts each other. If the connectivity detector 510 detects a connection (i.e., contact) of the wireless charger 470, the control unit 400 controls the display unit 430 to display locations of the wireless chargers 470 of the contacted devices. If the locations of the wireless chargers are not identical, the control unit 400 performs an operation of guiding so that the locations of the wireless chargers become identical.

The control unit 400 generates charging scores with predetermined intervals. Further, the control unit 400 generates a charging score of the battery 460 at the time of detecting a connection of an external electronic device. If the connection of the external electronic device is detected, the control unit 400 exchanges charging scores by receiving a charging score of the external electronic device and transmitting its own generated charging score to the external electronic device through the communication unit 420. The charging score is generated by calculating a residual amount of the battery 460 and a predetermined charging factor with a weighted value and processing to a predetermined ratio. The charging factor includes a battery capacity, an emergency call, a current location of electronic device, a device usage frequency, and user preference. The charging factor is set by a user. The method of generating a charging score of the battery 460 in the control unit 400 includes calculating at least one charging factor with a weighted value among the battery residual amount and the charging factors (such as the battery capacity is set as a default factor) and adjusting the calculated result with a predetermined ratio.

The control unit 400 decides a charging/charged mode by using the charging score of the external electronic device and its own charging score at operation 1015. Namely, the control unit 400 decides an operating mode of the electronic device based at least one of a charging score of the external electronic device (such as information related to the battery of the external electronic device) or its own charging score (such as information related to the battery 460). Here, the operating mode is decided by selecting one from an operating mode of receiving an electric power from the external electronic device to the electronic device, an operating mode of supplying an electric power from the electronic device to the external electronic device, or an operating mode of non-transferring between the electronic device and the external electronic device.

When deciding a charging/charged mode at operation 1015, the control unit 400 decides the charging/charged mode by using other parameters besides the charging score.

Hereafter, a first method of deciding a charging/charged mode is described. If an electronic device is connected to a charger in a state that 2 or more electronic devices are connected, the control unit 400 differently performs a wireless charging operation according to the portability of the connected electronic device. For example, if the electronic device is non-portable, the charging score has the maximum value (such as 100), and if the electronic device is portable, the charging score does not have the maximum value according to its state. Namely, if an electronic device connected to a TA requires charging firstly, the electronic device does not reflect it to the charging score so that the charging score doesn't become the maximum value.

Hereafter, a second method of deciding a charging/charged mode is described. The electronic devices decide the priority of charging independently from the charging scores, and the priority of wireless charging is decided by synchronizing with a variety of setting information. For example, if a specific schedule is set (such as if a battery residual amount must have a predetermined value because a charging time and an important function are set), the electronic device adjusts the priority of charging according to the set schedule.

Hereafter, a third method of deciding a charging/charged mode is described. The charging/charged mode is decided according to connecting locations of the electronic devices. For example, in case of performing a wireless charging operation by contacting the electronic devices each other, the electronic device decides the priority of charging according to the order of connecting the electronic devices (as shown in FIGS. 7A and 7B).

Hereafter, a fourth method of deciding a charging/charged mode is described. When 3 or more electronic devices are connected, the electronic device is set wireless charging and charged operation by groups. For example, if 4 electronic devices are connected and each electronic device have a different value of charging score (such as 100%, 60%, 40%, and 20%), the electronic device decides the charging/charged mode by considering the charging scores and by grouping an electronic device having the greatest charging score and an electronic device having the smallest charging score, for example, 2 groups (such as 100% & 20%/60% & 40%).

Hereafter, a fifth method of deciding a charging/charged mode is described. The electronic device includes an emergency mode. The emergency mode is used for charging the battery 460 so that the electronic device performs an emergency call or communication. If the emergency mode is set, the electronic device decides a charging mode that wirelessly receives a battery power of a connected external electronic device to charge the battery 460. Further, if the emergency mode is set to the external electronic device, the electronic device decides a charged mode so that an electric power of its own battery 460 is wirelessly transmitted to the connected external electronic device.

Subsequently, the control unit 400 performs a charging operation of the decided charging mode, and generates and transmits a changed charging score to the external electronic device according to the charging operation at operation 1017. When performing the charging/charged operation, the control unit 400 controls the display unit 430 to display a charging state including at least one of a battery charging amount of an electronic device charging or being charged, estimated charging time, and charging/charged amount. The method of displaying a charging/charged state is one of a method of displaying a popup window or a method of displaying an indicator. The control unit 400 generates and transmits a new charging score to the external electronic device according to a change of charging amount of the battery 460. Here, the method of transmitting a charging score is performed through the communication unit 420 in a wireless communication, and the wireless communication is a near-field communication.

If the charging/charged state satisfies a predetermined condition while performing the charging/charged operation, the control unit 400 terminates the charging/charged operation at operation 1019. The control unit 400 compares and analyzes a charging score received from the external electronic device with its own charging score, and terminates the charging if the received charging score and its own charging score have a predetermined value. Here, the predetermined value is a value of which the charging scores are balanced. Further, the predetermined value of its own charging score and the charging score of the external electronic device have a difference within a predetermined range or may have a critical charging value having a specific size.

Figure 11:
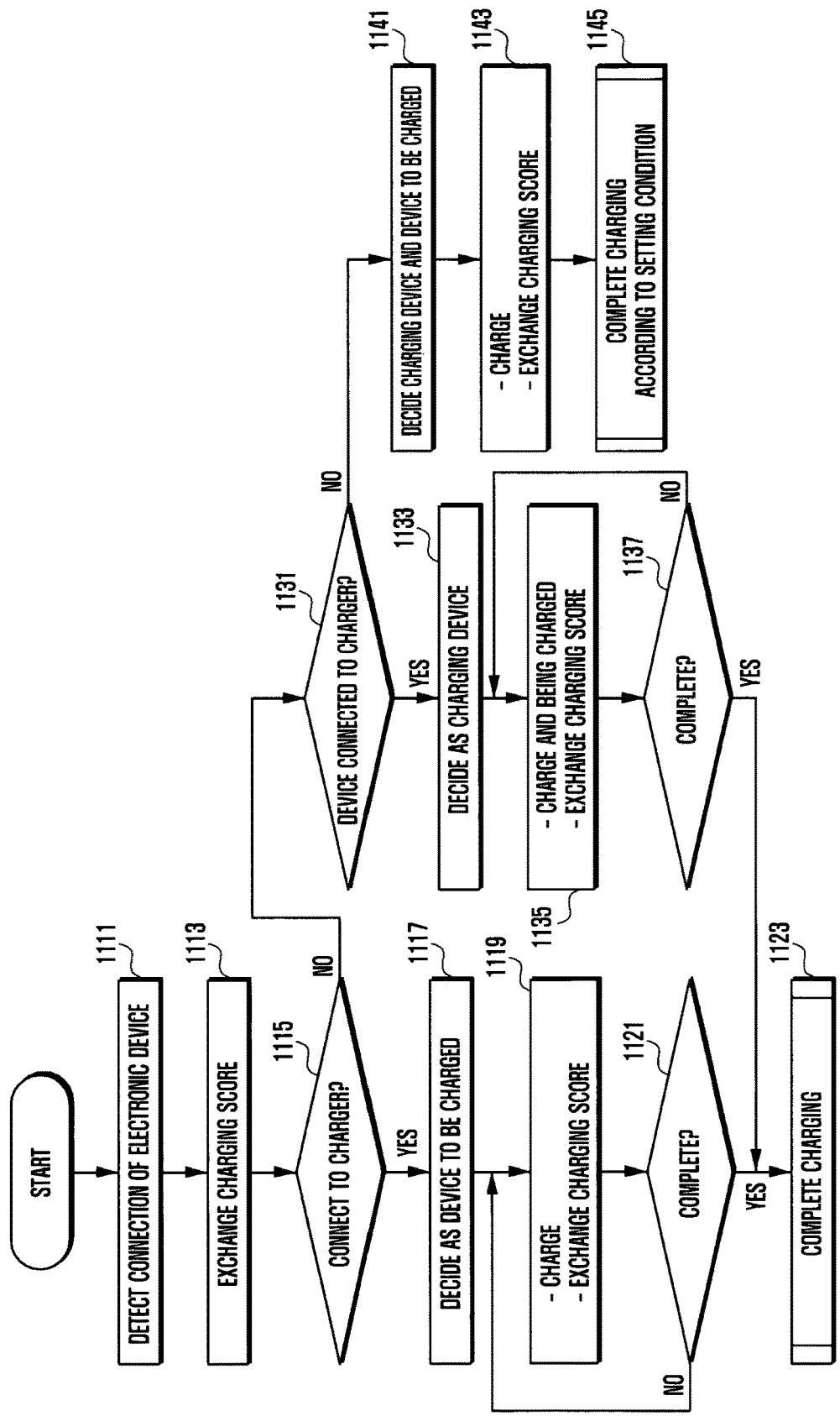
FIG. 11 is a flowchart illustrating a procedure of performing a wireless charging when an electronic device is connected to an external charger according to various embodiments of the present disclosure.

FIG. 11 is a flowchart illustrating a procedure of performing a wireless charging when an electronic device is connected to an external charger according to various embodiments of the present disclosure.

Referring to FIG. 11, if an external electronic device is connected, the control unit 400 detects the connection of the external electronic device at operation 1111, and exchanges charging scores with the connected external electronic device at operation 1113. If a charger 450 is connected to an external power at operation 1115, the control unit 400 detects the connection, and decides the electronic device as a charging device for charging the external electronic device at operation 1117. Operation 1115 is performed prior to operation 1113. If decided as a device to be charged, the control unit 400 wirelessly transmits an electric power converted from the external power by the charger 450 to the external electronic device through the wireless charger 470, and performs a charged operation of the battery 460 at operation 1119. Further, the control unit 400 generates and exchanges a charging score according to a change of battery charging of the external electronic device. Subsequently, the control unit 400 identifies whether the charging scores satisfy a predetermined condition by comparing and analyzing the charging scores at operation 1121, and terminates the charging/charged operation at operation 1123.

If the charger 450 of the external electronic device is connected to an external power, the control unit 400 detects the connection at operation 1131, and decides the electronic device as a charging device at operation 1133. Operation 1131 is performed prior to operation 1113. If decided as a charging device, the control unit 400 charges the battery by receiving an electric power wirelessly transmitted from the external electronic device through the wireless charger 470 at operation 1135. Further, the control unit 400 generates and exchanges charging scores according to a change of battery charging of the external electronic device. Subsequently, the control unit 400 identifies whether the charging scores satisfy a predetermined condition by comparing and analyzing the charging scores at operation 1137, and terminates the charging/charged operation at operation 1123.

However, if the electronic device or the external electronic device is not connected to an external power, the control unit 400 performs the charging/charged operation through operations 1141 to 1145 in the same method as FIG. 10.

Figure 12:
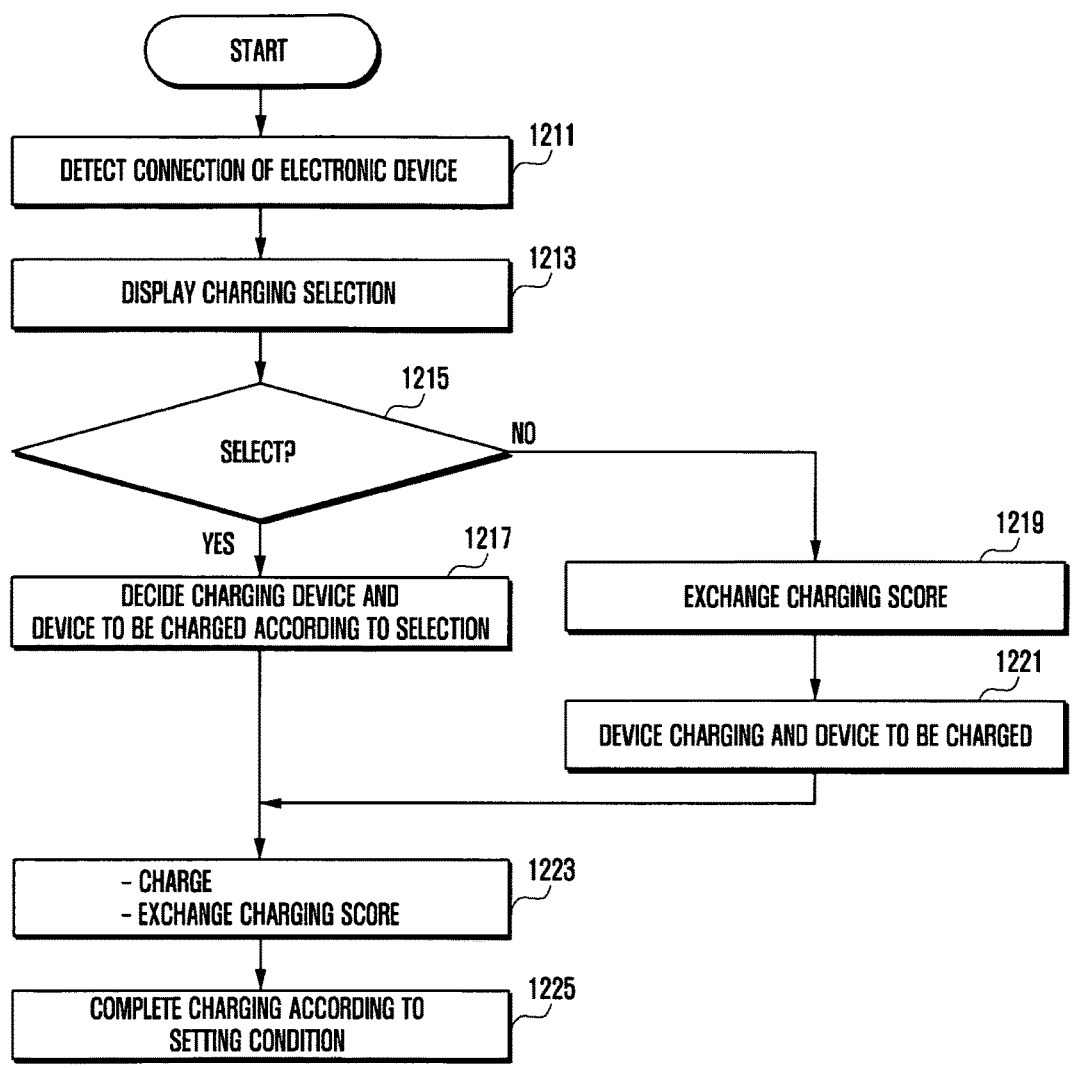
FIG. 12 is a flowchart illustrating a procedure of performing a wireless charging corresponding to a user selection in an electronic device according to various embodiments of the present disclosure.

FIG. 12 is a flowchart illustrating a procedure of performing a wireless charging corresponding to a user selection in an electronic device according to various embodiments of the present disclosure.

Referring to FIG. 12, if an external electronic device is connected, the control unit 400 detects the connection at operation 1211, and controls the display unit 430 to display kinds (or types) of the connected devices at operation 1213. A user connects a plurality of electronic devices when performing a wireless charging, and select a charging device and a device to be charged from the displayed electronic devices. Here, if the user selects a device, the control unit 400 identifies the selection at operation 1215, and decides the electronic device as a charging device or a device to be charged according to the user selection at operation 1217. Subsequently, the control unit 400 performs charging and exchanges charging scores at operation 1223, and terminates the charging and charged if the charging scores satisfy a predetermined condition at operation 1225.

However, the control unit 400 identifies whether the charging device or device to be charged is not selected at operation 1215, and performs a wireless charging through operations 1219, 1221, 1223, and 1225.

Figure 13:
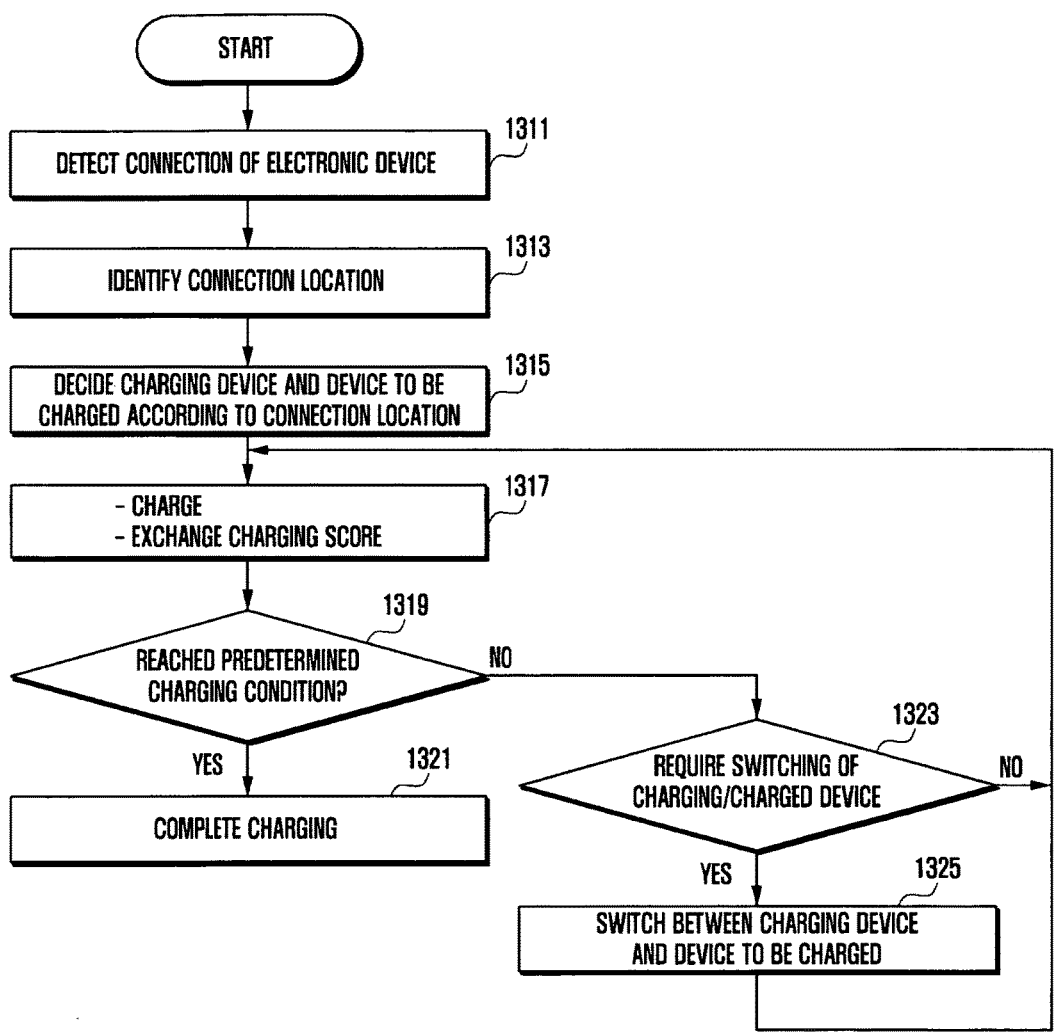
FIG. 13 is a flowchart illustrating a procedure of performing a wireless charging corresponding to a contact location between electronic devices according to various embodiments of the present disclosure.

FIG. 13 is a flowchart illustrating a procedure of performing a wireless charging corresponding to a contact location between electronic devices according to various embodiments of the present disclosure.

Referring to FIG. 13, the control unit 400 detects connections of electronic devices at operation 1311, and identifies locations of the electronic devices at operation 1313. Here, the locations of the electronic devices are identified by a sensor or by analyzing outputs of the wireless charger 470 and the communication unit 420. According to the locations of connected electronic devices, the charging/charged mode can be decided. For example, in case of performing a wireless charging operation by contacting electronic devices, the electronic device decides the priority of charging according to the order of connecting (such as a stacking order of electronic devices). Further, the priority of charging is decided according to the stacking order of the electronic devices. For example, an electronic device located at lower side is decided as a charging device (or a device to be charged), and an electronic device located at the upper side is decided as a device to be charged (or a charging device).

After deciding the charging device and the device to be charged, the control unit 400 performs a charging/charged operation of the electronic device according to the result of deciding at operation 1317. Charging scores of the batteries is exchanged according to a change of charging/charged state. If the charging/charged operation satisfies a predetermined condition while performing the charging/charged operation, the control unit 400 identifies it at operation 1319, and terminates the charging/charged operation at operation 1321.

While performing the charging/charged operation, a switchover between the charging device and the device to be charged is necessary according to the result of the charging/charged operation. For example, if the charging is excessively performed more than the predetermined condition, the necessity of switchover between the charging operation and the charged operation can be generated. Further, if another electronic device is connected or an external power is supplied to the charger, the switchover between the charging and charged operation is necessary. If the switchover between the charging and charged operation is necessary, the control unit 400 identifies it at operation 1323, and decides the charging device and the device to be at operation 1325. Subsequently, the control unit 400 returns to operation 1317 and repeats the same operations.

Figure 14:
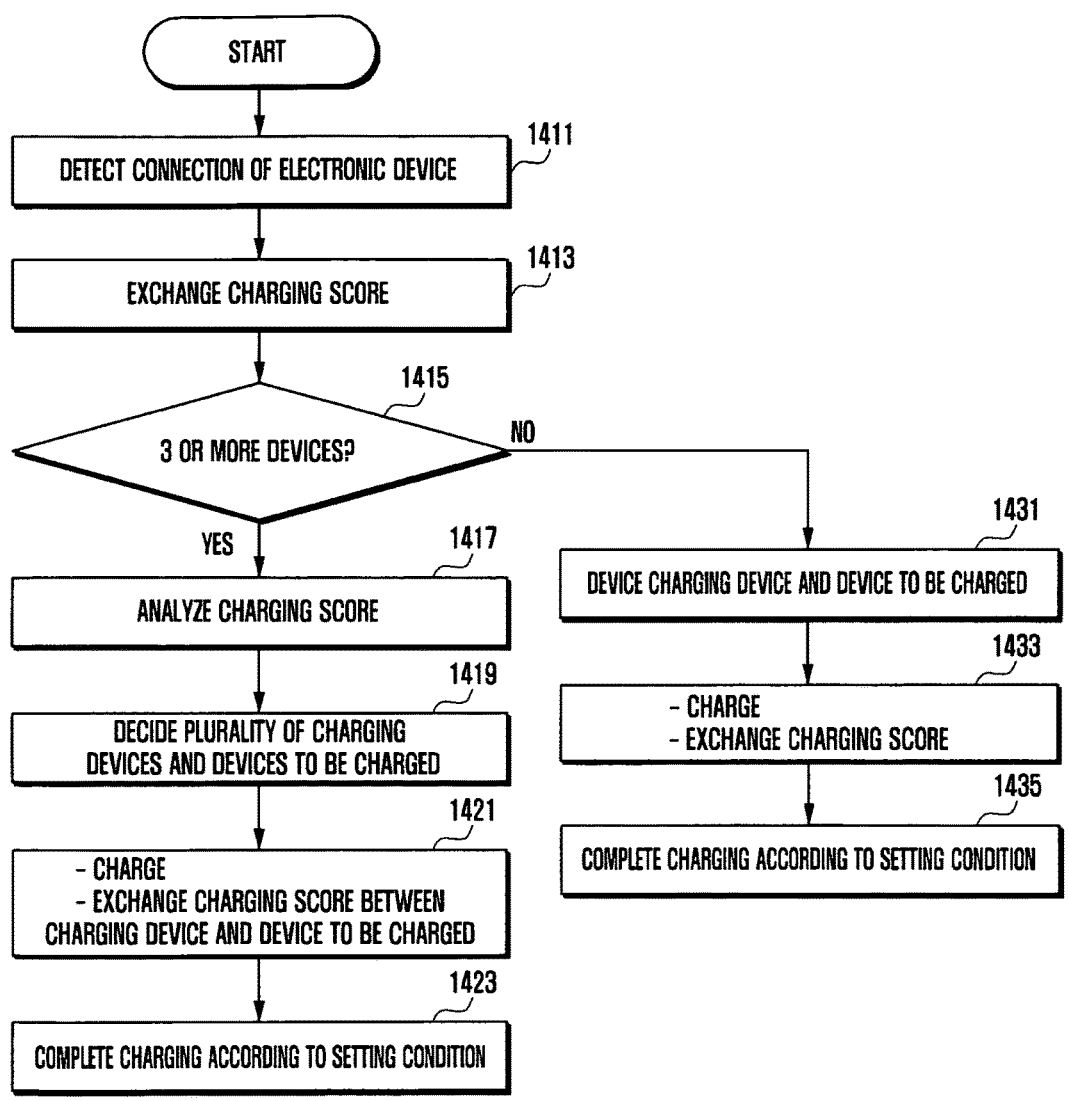
FIG. 14 is a flowchart illustrating a procedure of performing a wireless charging when 3 or more electronic devices are connected according to various embodiments of the present disclosure.

FIG. 14 is a flowchart illustrating a procedure of performing a wireless charging when 3 or more electronic devices are connected according to various embodiments of the present disclosure.

Referring to FIG. 14, if a connection of electronic devices capable of wireless charging is detected at operation 1411, the control unit 400 exchanges charging scores of the connected electronic devices at operation 1413. If 3 or more electronic devices are connected, the control unit 400 detects it at operation 1415, analyzes charging scores of the connected electronic devices at operation 1417, and decides a charging device or a device to be charged at operation 1419. The method of deciding the charging device and the device to be charged is performed by deciding an electronic device as a device to be charged and 2 or more electronic devices as a charging device. Alternatively, the method is performed by deciding an electronic device as a charging device and 2 or more electronic devices as a device to be charged. Further, the method of deciding the charging device and the device to be charged is performed by grouping the electronic devices. For example, if a plurality of electronic devices are connected, the method of grouping the electronic device is performed by grouping an electronic device having the greatest charging score and an electronic device having the smallest charging score, and by grouping an electronic device having the second greatest charging score and an electronic device having the second smallest charging score.

After deciding the charging device and the device to be charged, the control unit 400 performs the charging/charged operation of the electronic devices according to the result of deciding at operation 1421. Charging scores generated according to a charging/charged state is exchanged each other. If the charging/charged operation satisfies a predetermined condition while performing the charging/charged operation, the control unit 400 terminates the charging/charged operation at operation 1423.

If the connected devices are 2 or more, the control unit 400 detects it at operation 1415, and performs the charging/charged operation of the electronic devices through operations 1431, 1433, and 1435.

If electronic devices having a battery and a wireless charger are connected, a charging or charged mode is decided by exchanging charging scores of the connected electronic devices. Accordingly; the electronic device is charged in a state of moving and the direction of charging between the devices can be automatically decided.

Further, the charging scores is generated not only by the current battery residual amount but also by considering various factors of charging and charged. Accordingly, the direction of charging between the electronic devices is decided in various forms and methods. Although embodiments of the disclosure have been described in detail hereinabove, it should be understood that many variations and modifications of the basic inventive concept described herein will still fall within the spirit and scope of the disclosure as defined in the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, the method comprising:
receiving information related to a second battery from an external electronic device that includes the second battery, by the electronic device, wherein the electronic device includes a first battery and a charger for charging the first battery; and
determining, by the electronic device, whether to (i) receive an electric power from the external electronic device, (ii) supply an electric power to the external electronic device, or (iii) enter a non-transfer mode where an electric power is not transferred between the electronic device and the external electronic device, wherein the determination is based on at least one of the received information related to the second battery or information related to the first battery, and wherein the method further comprises determining that the electronic device supplies the electric power to the external electronic device in response to detecting that an external charger is connected to the electronic device.

2. The method of claim 1, wherein the information related to the second battery is received using wireless communication between the external electronic device and the electronic device.

3. The method of claim 2, wherein the wireless communication comprises a near-field communication.

4. The method of claim 2, wherein the information related to the second battery is received using a wireless charging protocol between the external electronic device and the electronic device.

5. The method of claim 1, wherein the charger comprises a wireless charger, and the reception or supply of the electric power is performed using the wireless charger.

6. The method of claim 1, further comprising:
displaying locations of the electronic device and the external electronic device on a display unit.

7. The method of claim 4, wherein receiving the information further comprises:
detecting a second battery residual amount;
generating a charging score of the external electronic device in accordance with the second battery residual amount and predetermined values of charging factors; and
transmitting the charging score to the external electronic device.

8. The method of claim 7, wherein the charging factors comprise a battery capacity.

9. The method of claim 7, wherein the charging factors are determined by a possibility of an emergency call.

10. The method of claim 7, wherein the charging factors comprise location information of the external electronic device.

11. The method of claim 7, wherein the charging factors comprise a user preference.

12. The method of claim 7, wherein the charging factors comprise a device usage frequency.

13. The method of claim 1, further comprising:
determining a charging by receiving the electric power from the external electronic device if the information related to the second battery is greater than the information related to the first battery;
determining a charging by supplying the electric power to the external electronic device if the information related to the first battery is greater than the information related to the second battery; and
determining not to charge if the information related to the first battery and the information related to the second battery are balanced.

14. The method of claim 13, further comprising:
generating a charging score and transmitting the charging score to the external electronic device according to a charging amount change if a charging operation is performed.

15. The method of claim 14, further comprising:
displaying a charging state of the first battery and the second battery with at least one of a popup displaying technique or an indicator displaying technique if the charging operation is performed.

16. The method of claim 15, further comprising:
comparing the information associated with the first battery with the information associated with the second battery of the external electronic device while performing the charging operation, wherein the electric power is not transferred if the information associated with the first battery and the second battery satisfy a predetermined value.

17. The method of claim 1, further comprising:
determining a charging by supplying the electric power to the external electronic device if the information associated with the second battery includes emergency call information; and
determining a charging by receiving the electric power from the external electronic device if the information associated with the first battery includes emergency call information.

18. The method of claim 1, further comprising:
determining a charging by receiving the electric power from the external electronic device if the information associated with the second battery includes information of connecting the charger to an external power; and
determining a charging by supplying the electric power to the external electronic device if the information associated with the first battery includes information of connecting the charger to an external power.

19. The method of claim 1, further comprising:
determining a charging by receiving the electric power from the external electronic device if the external electronic device is located at a lower side of the electronic device; and
determining a charging by supplying the electric power to the external electronic device if the external electronic device is located at an upper side of the electronic device.

20. The method of claim 1, further comprising:
determining a charging by receiving the electric power from the external electronic device if the external electronic device is located at an upper side of the electronic device; and
determining a charging by supplying the electric power to the external electronic device if the external electronic device is located at a lower side of the electronic device.

21. The method of claim 1, further comprising:
determining a number of connected devices, wherein a charging direction for the number of connected devices is determined in accordance with a charging score such that a device having a greatest charging score charges a device having a smallest charging score and a device having a second greatest charging score charges a device having a second smallest charging score.

22. An electronic device comprising:
a first battery;
a charger configured to charge the first battery by using an external power;
a wireless charger configured to perform a wireless charging between a second battery of an external electronic device and the first battery;
a communication unit configured to receive information associated with the second battery from the external electronic device, wherein the external electronic device includes the second battery; and
a controller configured to determine whether to (i) receive an electric power from the external electronic device through the communication unit, (ii) supply an electric power to the external electronic device, or (iii) enter a non-transfer mode where an electric power is not transferred between the electronic device and the external electronic device, wherein the determination is based on at least one of the received information related to the second battery or information related to the first battery, and wherein the controller is further configured to determine that the electronic device supplies the electric power to the external electronic device in response to detecting that an external charger is connected to the electronic device.

23. The electronic device of claim 22, wherein the communication unit is configured to perform a wireless communication with the external electronic device.

24. The electronic device of claim 23, wherein the wireless communication is a near-field communication.

25. The electronic device of claim 22, wherein the communication unit uses a wireless charging protocol between the external electronic device and the electronic device.

26. The electronic device of claim 24, wherein the controller is configured to receive information associated with the first battery and the second battery through the communication unit via near-field communication, and display locations of wireless chargers of the electronic device and the external electronic device on a display unit.

27. The electronic device of claim 22, wherein the controller is configured to transmit a charging score of the first battery to the external electronic device, the charging score combining a residual amount of the first battery and predetermined values of charging factors.

28. The electronic device of claim 27, wherein the charging factors comprise a battery capacity.

29. The electronic device of claim 27, wherein the charging factors comprise a possibility of an emergency call.

30. The electronic device of claim 27, wherein the charging factors comprise location information of the external electronic device.

31. The electronic device of claim 27, wherein the charging factors comprise a user preference.

32. The electronic device of claim 27, wherein the charging score further comprises a device usage frequency.

33. The electronic device of claim 22, wherein the controller is configured to:
analyze information associated with the first battery and the second battery;
determine a charging by receiving an electric power from the external electronic device if the information related to the second battery is greater than the information related to the first battery;
determine a charging by supplying an electric power to the external electronic device if the information related to the first battery is greater than the information related to the second battery; and
determine not to charge if the information related to the first battery and the information related to the second battery are balanced.

34. The electronic device of claim 33, wherein the controller is configured to:
generate a charging score; and
transmit the charging score to the external electronic device according to a charging amount change while transferring the electric power through the wireless charger.

35. The electronic device of claim 34, wherein the controller is configured to display a charging state of the first battery and the second battery on a display unit with at least one of a popup displaying technique or an indicator displaying technique while transferring the electric power through the wireless charger.

36. The electronic device of claim 35, wherein the controller is configured to:
analyze the information associated with the second battery and the information associated with the first battery while transferring the electric power through the wireless charger, wherein the electric power is not transferred if the information related to the first and second batteries satisfies a predetermined value.

37. The electronic device of claim 22, wherein the controller is configured to:
analyze the information associated with the first and second batteries;
determine a charging by supplying an electric power to the external electronic device if the information associated with the second battery includes emergency call information; and
determine a charging by receiving an electric power from the external electronic device if the information associated with the first battery includes emergency call information.

38. The electronic device of claim 22, wherein the controller is configured to:
analyze the information associated with the first and second batteries;
determine a charging by receiving an electric power from the external electronic device if the information associated with the second battery includes connection information of the charger to an external power; and
determine a charging by supplying an electric power to the external electronic device if the information associated with the first battery includes connection information of the charger to an external power.

39. The electronic device of claim 22, further comprising:
a sensor configured to detect locations of the electronic device and the external electronic device, wherein the controller is configured to determine a charging by receiving an electric power from the external electronic device if the external electronic device is located at a lower side of the electronic device, and supplying an electric power to the external electronic device if the external electronic device is located at an upper side of the electronic device.

40. The electronic device of claim 22, further comprising:
a sensor configured to detect locations of the electronic device and the external electronic device, wherein the controller is configured to determine a charging by receiving an electric power from the external electronic device if the external electronic device is located at an upper side of the electronic device, and supplying an electric power to the external electronic device if the external electronic device is located at a lower side of the electronic device.

41. The electronic device of claim 22, wherein the controller is configured to:
determine a number of connected devices; and
determine a charging direction for the number of connected devices such that a device having a greatest charging score charges a device having a smallest charging score, and a device having a second greatest charging score charges a device having a second smallest charging score.

* * * * *